(12) United States Patent
Blohm et al.

(10) Patent No.: US 11,999,643 B2
(45) Date of Patent: Jun. 4, 2024

(54) CROSS CURRENT STAGED REVERSE OSMOSIS

(71) Applicant: Battelle Memorial Institute, Columbus, OH (US)

(72) Inventors: Kurt Blohm, Columbus, OH (US); Richard Peterson, Columbus, OH (US); Ann E. Lane, Columbus, OH (US); Slawomir Winecki, Columbus, OH (US); Darwin Argumedo, Columbus, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 227 days.

(21) Appl. No.: 15/613,793

(22) Filed: Jun. 5, 2017

(65) Prior Publication Data
US 2017/0349467 A1     Dec. 7, 2017

Related U.S. Application Data

(60) Provisional application No. 62/467,858, filed on Mar. 7, 2017, provisional application No. 62/346,116, filed on Jun. 6, 2016.

(51) Int. Cl.
*C02F 9/00* (2023.01)
*B01D 61/00* (2006.01)
(Continued)

(52) U.S. Cl.
CPC .............. *C02F 9/00* (2013.01); *B01D 61/002* (2013.01); *B01D 61/025* (2013.01);
(Continued)

(58) Field of Classification Search
CPC .... C02F 9/00; C02F 1/36; C02F 1/441; C02F 1/445; C02F 1/4691; C02F 2103/08;
(Continued)

(56) References Cited

U.S. PATENT DOCUMENTS 8,216,473 B2 * 7/2012 Wohlert ............... B01D 61/022
210/652
9,206,060 B1    12/2015 Abusharkh
(Continued)

OTHER PUBLICATIONS

Suss, Water desalination via capacitive deionization: what is it and what can we expect from it?, May 5, 2015, p. 4-5 (Year: 2015).*
(Continued)

*Primary Examiner* — Dirk R Bass
(74) *Attorney, Agent, or Firm* — Lippes Mathias LLP

(57) ABSTRACT

Systems and processes for purifying and concentrating a liquid feed stream are disclosed. In the systems, the concentrated liquid output from the high pressure side of a reverse osmosis stage is used as the draw solution in the low pressure side of the reverse osmosis stage in a configuration called osmotically assisted reverse osmosis. This reduces the osmotic pressure differential across the membrane, permitting high solute concentrations to be obtained, hastening the purification of the liquid. Reduced system pressures are also obtained by arranging multiple osmotically assisted reverse osmosis stages in a cross-current arrangement. Overall system energy consumption is reduced compared to conventional thermal processes for high concentration streams.

17 Claims, 19 Drawing Sheets

(51) Int. Cl.
*B01D 61/02* (2006.01)
*B01D 61/04* (2006.01)
*B01D 61/06* (2006.01)
*B01D 61/08* (2006.01)
*B01D 61/58* (2006.01)
*C02F 1/44* (2023.01)
*C02F 103/08* (2006.01)
*C02F 1/36* (2023.01)
*C02F 1/469* (2023.01)
*F03G 7/00* (2006.01)

(52) U.S. Cl.
CPC ........... *B01D 61/026* (2022.08); *B01D 61/04* (2013.01); *B01D 61/06* (2013.01); *B01D 61/08* (2013.01); *B01D 61/58* (2013.01); *B01D 2311/04* (2013.01); *B01D 2311/06* (2013.01); *B01D 2311/08* (2013.01); *B01D 2311/25* (2013.01); *B01D 2311/2684* (2013.01); *B01D 2313/243* (2013.01); *B01D 2313/246* (2013.01); *B01D 2315/10* (2013.01); *B01D 2317/02* (2013.01); *B01D 2317/025* (2013.01); *B01D 2319/04* (2013.01); *C02F 1/36* (2013.01); *C02F 1/441* (2013.01); *C02F 1/445* (2013.01); *C02F 1/4691* (2013.01); *C02F 2103/08* (2013.01); *C02F 2301/046* (2013.01); *C02F 2301/08* (2013.01); *C02F 2303/10* (2013.01); *F03G 7/005* (2013.01)

(58) Field of Classification Search
CPC ............ C02F 2301/046; C02F 2303/10; C02F 2301/08; C02F 1/442; C02F 1/444; C02F 1/004; C02F 1/385; C02F 1/44; C02F 1/469; C02F 1/4693; C02F 2101/108; C02F 2101/16; C02F 2103/007; C02F 2103/06; C02F 2209/005; C02F 2209/03; C02F 2209/05; C02F 2209/40; C02F 2103/10; C02F 1/04; C02F 1/048; C02F 1/14; C02F 1/16; C02F 11/04; C02F 2103/365; C02F 2201/006; C02F 2201/009; C02F 2301/043; C02F 2301/066; C02F 2303/24; C02F 1/006; C02F 1/265; C02F 1/5245; C02F 2001/5218; C02F 2103/00; B01D 61/002; B01D 61/022; B01D 61/025; B01D 61/04; B01D 61/06; B01D 61/08; B01D 61/58; B01D 2311/04; B01D 2311/06; B01D 2311/08; B01D 2311/25; B01D 2311/2684; B01D 2313/243; B01D 2313/246; B01D 2315/10; B01D 2317/02; B01D 2317/025; B01D 2319/04; B01D 2311/12; B01D 2317/022; B01D 2311/2642; B01D 2311/2673; B01D 61/027; B01D 61/12; B01D 65/02; B01D 2311/13; B01D 2311/14; B01D 2311/16; B01D 2313/083; B01D 2313/50; B01D 2315/06; B01D 2317/04; B01D 2321/04; B01D 2321/06; B01D 2321/12; B01D 2321/162; B01D 2321/168; B01D 2323/30; B01D 61/005; B01D 61/145; B01D 61/364; B01D 61/422; B01D 61/44; B01D 63/082; B01D 67/0093; B01D 69/10; B01D 69/125; B01D 69/144; B01D 71/56; B01D 71/74; B01D 61/026; B01D 61/10; B01D 2311/2688; B01D 2313/04; B01D 2313/146; B01D 2313/24; B01D 2313/36; B01D 2317/06; B01D 61/147; B01D 63/02; B01D 63/043; B01D 63/10; B01D 63/103; B01D 69/06; B01D 69/08; B01D 71/06; B01D 61/0271; B01D 2009/0086; B01D 2311/2512; B01D 2311/2521; B01D 2311/2523; B01D 2311/2531; B01D 2311/2643; B01D 2311/2699; B01D 2315/24; B01D 61/428; B01D 9/0059; B01D 9/02; F03G 7/005; A01C 23/042; A61M 1/1623; F16F 1/025; F23R 3/60; Y02A 20/131; Y02P 60/21; Y02P 60/214; Y02W 10/37; Y10S 204/905; C01D 3/06; C01F 11/46; C01F 11/468; C01F 5/30; C01F 5/32; C01F 5/34
See application file for complete search history.

(56) References Cited

U.S. PATENT DOCUMENTS

| | | | | |
|---|---|---|---|---|
| 10,434,480 | B2* | 10/2019 | Mentzel | ............... B01D 69/144 |
| 10,953,367 | B2 | 3/2021 | Chang | |
| 2009/0008330 | A1* | 1/2009 | Thorsen | ................. B01D 65/02 |
| | | | | 210/636 |
| 2009/0071902 | A1* | 3/2009 | Stover | ................... F01K 27/005 |
| | | | | 210/637 |
| 2010/0032377 | A1 | 2/2010 | Wohlert | |
| 2010/0183903 | A1* | 7/2010 | McGinnis | ................. C02F 1/16 |
| | | | | 429/50 |
| 2010/0294718 | A1 | 11/2010 | Treyvaud | |
| 2014/0007564 | A1* | 1/2014 | Efraty | ....................... F03G 7/04 |
| | | | | 60/327 |
| 2017/0066670 | A1* | 3/2017 | El-Sayed | ............... B01D 61/04 |
| 2019/0070560 | A1* | 3/2019 | Kennedy | ............. B01D 61/002 |

OTHER PUBLICATIONS

Lenntech, Reverse Osmosis Pretreatment, Jan. 4, 2008, p. 1 (Year: 2008).*
Mahvi, Application of Ultrasonic Technology for Water and Wastewater Treatment, Jun. 17, 2009, p. 1, 13-14 (Year: 2009).*
Stoughton et al., Reverse Osmosis Optimization, Aug. 2013, p. 11-12/10 (Year: 2013).*
International Search Report for PCT/US2017/035724 dated Sep. 14, 2017.
Extended European Search Report of Application No. EP 22180228 dated Jun. 13, 2023.

* cited by examiner

CROSS CURRENT STAGED REVERSE OSMOSIS

CROSS-REFERENCE TO RELATED APPLICATIONS

This application claims priority to U.S. Provisional Patent Application Ser. No. 62/346,116, filed on Jun. 6, 2016, and to U.S. Provisional Patent Application Ser. No. 62/467,858, filed on Mar. 7, 2017. These disclosures are hereby fully incorporated by reference in their entirety.

BACKGROUND

The present disclosure relates to systems and methods for purifying a liquid feed stream by removing various solutes from the liquid feed stream to obtain a purified permeate, or output stream. In particular, such methods are contemplated to be useful in desalination of saltwater and concentration of brines. Multiple reverse osmosis stages are arranged in a cross-current osmotically assisted reverse osmosis (OARO) arrangement that permits the use of reduced pressures and overall lower energy consumption compared to traditional reverse osmosis processes. Additionally, the arrangement allows the application of such systems to streams that are concentrated beyond what is typically practical for reverse osmosis.

An osmotic membrane is semi-permeable barrier which allows smaller molecules (usually solvent molecules such as water) to pass through while blocking the passage of relatively larger molecules or ions (e.g. solutes dissolved in the solvent). Osmotic pressure is generally related to the difference in solute concentration between the liquids on either side of the osmotic membrane. Reverse osmosis ("RO") is the process of applying pressure to the side of the osmotic membrane containing the higher solute concentration in excess of the osmotic pressure, which serves to drive the osmotic process in reverse, i.e. drives solvent through the osmotic membrane to the side with a lower solute concentration. RO is suitable for a wide range of applications, especially when salt and/or dissolved solids need to be removed from a solvent, and is commonly used for desalination.

To achieve increased solvent separation, higher driving pressure must be applied. However, due to operational pressure limitations of many available osmotic membranes, increased driving pressure is not always feasible. Other methods have been used, such as distillation (e.g., multiple stage flash, vacuum, etc.); mechanical vapor recompression; thermal vapor recompression; forward osmosis; and/or single or multi-stage evaporators. These methods are typically all relatively energy intensive compared to reverse osmosis. Other methods have relied on the use of multiple interstage pumps, valves, bypasses from low pressure to high pressure sides of membranes, and plumbing to mix streams of similar concentrations so as to improve process efficiency. However, in practice, such setups are complicated to run, especially during startup and process upsets.

There remains a need for less complex reverse osmosis processes and systems which permit purification of a liquid, but operate at reduced pressures and/or have reduced overall system energy consumption, and can be used with liquids having both high and low solute concentrations.

BRIEF DESCRIPTION

The present disclosure presents partially cascading cross-current reverse osmosis systems which meets these needs.

Disclosed in various embodiments herein are systems and processes for purifying liquid streams in which reverse osmosis stages are staged in a partially cascading, cross-current arrangement. The arrangements disclosed herein permit reduction in osmotic pressure differential, purification of solutions with very high solute concentrations, and operation at reduced pressures with similar separation efficiencies compared to conventional arrangements.

Disclosed herein are systems for purifying a liquid feed stream to obtain a permeate, comprising: (a) an initial osmotically assisted reverse osmosis stage having: a high pressure side with a high pressure side inlet for receiving the liquid feed stream and a high pressure side outlet for outputting a recycle stream and a concentrate stream, and a low pressure side with a low pressure side inlet for receiving the recycle stream from the high pressure side outlet, and a low pressure side outlet for outputting a diluted stream; (b) an intermediate section having one or more intermediate osmotically assisted reverse osmosis stages arranged in series, wherein each intermediate stage has: a high pressure side with a high pressure side inlet and a high pressure side outlet, a low pressure side with a low pressure side inlet and a low pressure side outlet, a recycle stream and a concentrate stream exiting the high pressure side outlet, the recycle stream being sent to the low pressure side inlet, and an exit stream exiting the low pressure side outlet; and wherein the intermediate section receives the diluted stream from the initial osmotically assisted reverse osmosis stage and outputs a purified stream; and (c) a final reverse osmosis stage having: a high pressure side having a high pressure side inlet for receiving the purified stream and a high pressure side outlet for outputting a reject stream, and a low pressure side that outputs the permeate.

In some embodiments, the reject stream of the final reverse osmosis stage is combined with the diluted stream from the initial osmotically assisted reverse osmosis stage and received by the intermediate section. The system can further comprise a pressurizing means for increasing the pressure of the diluted stream. In other embodiments, the reject stream of the final reverse osmosis stage is combined with the liquid feed stream and received by the initial osmotically assisted reverse osmosis stage.

Sometimes, the system further comprises a pressure reduction device through which at least the recycle stream of the initial osmotically assisted reverse osmosis stage passes for reducing a pressure of the recycle stream. Also, the system may further comprise an energy recovery device at the high pressure side outlet of each intermediate osmotically assisted reverse osmosis stage.

In particular embodiments, the system further comprises (i) a feed pump for pressurizing the liquid feed stream received by the initial osmotically assisted reverse osmosis stage, (ii) one or more interstage pumps for pressurizing the diluted stream that is received by the intermediate section, and (iii) a final pump for pressurizing the purified stream received by the final reverse osmosis stage.

In particular embodiments, the intermediate section has a first intermediate osmotically assisted reverse osmosis stage and a second intermediate osmotically assisted reverse osmosis stage, the first intermediate osmotically assisted reverse osmosis stage receives the diluted stream from the initial osmotically assisted reverse osmosis stage, the high pressure side of the second intermediate osmotically assisted reverse osmosis stage receives the exit stream of the first intermediate reverse osmosis stage, the purified stream is the exit stream of the second intermediate osmotically assisted reverse osmosis stage, and the reject stream of the final reverse osmosis stage is combined with the exit stream of the first intermediate osmotically assisted reverse osmosis stage and received by the second intermediate osmotically assisted reverse osmosis stage.

Sometimes, the system further comprises a means for pretreating the liquid feed stream. The pretreating means can include at least one of a capacitive deionization system and a forward osmosis system. Also, the system may further comprise a sonication system.

In some embodiments, the initial osmotically assisted reverse osmosis stage has a plurality of initial osmotically assisted reverse osmosis modules, wherein the low pressure side outlet of each initial osmotically assisted reverse osmosis module outputs a yield stream, and the yield streams are combined to form the diluted stream. Sometimes, for each initial osmotically assisted osmosis reverse module, an output stream exiting the high pressure side outlet is split to form a recycle stream that is fed to the low pressure side outlet. The recycle stream can pass through a valve or energy recovery device prior to being fed to the low pressure side outlet.

In additional embodiments, the intermediate section has a plurality of intermediate osmotically assisted reverse osmosis stages or modules, wherein the low pressure side outlet of each intermediate osmotically assisted reverse osmosis stage/module outputs a yield stream, and the yield streams are combined to form the purified stream. Sometimes, for each intermediate osmosis reverse stage/module, an output stream exiting the high pressure side outlet is split to form a recycle stream that is fed to the low pressure side outlet. The recycle stream can pass through a valve or energy recovery device prior to being fed to the low pressure side outlet.

In some other embodiments, the initial osmotically assisted reverse osmosis stage has a plurality of initial osmotically assisted reverse osmosis modules, wherein the low pressure side outlet of each initial osmotically assisted reverse osmosis module outputs a yield stream, and each yield stream is sent to a separate permeate concentration stage that outputs a concentrate stream and a permeate stream. Put another way, each initial reverse osmosis module has a dedicated permeate concentration stage.

In additional embodiments, the intermediate section has a plurality of intermediate osmotically assisted reverse osmosis stages or modules, and the low pressure side outlet of each intermediate osmotically assisted reverse osmosis stage/module outputs a yield stream. Each yield stream is sent to a separate permeate concentration stage that outputs a concentrate stream and a permeate stream. Again, put another way, each intermediate osmotically assisted reverse osmosis stage/module has a dedicated permeate concentration stage.

The system may further comprise a pressure retarded osmosis stage having a high pressure side and a low pressure side. The high pressure side of the pressure retarded osmosis stage receives a high pressure concentrate stream and outputs a high pressure diluate. The low pressure side of the pressure retarded osmosis stage receives a dilute solution and outputs a concentrated solution. The high pressure concentrate stream is produced by pressurizing at least one of (a) the concentrate stream of the initial section and (b) the concentrate stream of the intermediate section.

The high pressure diluate can feed a pressure exchanger that produces the high pressure concentrate stream, and/or feed an energy recovery device.

The pressure retarded osmosis stage can be configured/operated so that fluid flow through the high pressure side and the low pressure side is counter-current or co-current.

Also disclosed are methods for purifying a liquid feed stream to obtain a permeate, comprising: feeding the liquid feed stream to a system as described above.

The reject stream of the final reverse osmosis stage can be combined with the diluted stream from the initial osmotically assisted reverse osmosis stage and received by the intermediate section.

The methods can further comprise increasing the pressure of the diluted stream prior to combining the diluted stream with the reject stream.

In some embodiments, the solute concentration of the diluted stream is about equal to the solute concentration of the reject stream prior to combining.

The maximum system pressure may be less than 300 psig.

In some embodiments, the liquid feed stream has a solute concentration of about 3 wt % to about 12 wt %; and the concentrate stream of the initial reverse osmosis stage has a higher solute concentration of about 7 wt % to about 25 wt %.

The system may have an energy consumption of less than 4.0 kWh/m$^3$ of permeate generated.

In some embodiments, the system further comprises a feed pump for pressurizing the liquid feed stream received by the initial osmotically assisted reverse osmosis stage, an interstage pump for pressurizing the diluted stream that is received by the intermediate section, and a final pump for pressurizing the purified stream received by the final reverse osmosis stage. Sometimes, the operating pressures of the feed pump, the interstage pump, and the final pump are within 50 psig of each other. In other embodiments, the operating pressures of the interstage pump and the final pump are about equal. In yet other embodiments, the operating pressure of the interstage pump is at least 50 psig less than the operating pressures of the feed pump and the final pump.

In particular embodiments, a solute removed from the liquid feed stream is fluoride, boron, ammonia, or a nitrate.

In particular embodiments, the methods further comprise pretreating the liquid feed stream prior to feeding the liquid feed stream to the system. The pretreating can include at least one of performing capacitive deionization and performing forward osmosis. Also, the methods can further comprise applying ultrasonic frequencies to a concentrate stream output as a result of pretreating the liquid feed stream.

Also disclosed herein are purification systems comprising at least one osmotically assisted reverse osmosis module, wherein the at least one osmotically assisted reverse osmosis module includes: a liquid feed stream that is separated into a feed input stream and a feed bypass stream; a high pressure side; and a low pressure side. The high pressure side receives the feed input stream and outputs a concentrate stream, and the low pressure side receives the feed bypass stream and outputs an exit stream.

The at least one osmotically assisted reverse osmosis module may be operated so that fluid flow through the high pressure side and the low pressure side is counter-current or co-current.

The feed bypass stream can pass through an energy recovery device or a pressure recovery device prior to entering the low pressure side.

In some embodiments, the liquid feed stream is pretreated before being separated into the feed input stream and the feed bypass stream. The liquid feed stream can be pretreated by a capacitive deionization system or a forward osmosis system. A concentrate stream produced by the capacitive deionization system can be further treated by sonication downstream using a sonication module or system.

The at least one osmotically assisted reverse osmosis module may be part of an initial stage or an intermediate section for obtaining a permeate from the liquid feed stream, as described above.

The purification system can further comprise a pressure retarded osmosis stage having a high pressure side and a low pressure side, wherein the high pressure side of the pressure retarded osmosis stage receives a high pressure concentrate stream and outputs a high pressure diluate; wherein the low pressure side of the pressure retarded osmosis stage receives a dilute solution and outputs a concentrated solution; and wherein the high pressure concentrate stream is produced by pressurizing the concentrate stream of the at least one osmotically assisted reverse osmosis module.

The high pressure diluate can feed a pressure exchanger that produces the high pressure concentrate stream, and/or feed an energy recovery device.

The pressure retarded osmosis stage of the purification system can be operated so that fluid flow through the high pressure side and the low pressure side is counter-current or co-current.

Also disclosed are methods for purifying a liquid feed stream to obtain an exit stream, comprising: separating the liquid feed stream into a feed input stream and a feed bypass stream; sending the feed input stream to a high pressure side of a osmotically assisted reverse osmosis module; and sending the feed bypass stream to a low pressure side of the osmotically assisted reverse osmosis module; wherein the low pressure side outputs the exit stream. Such methods can be performed using the purification systems described above.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1A:
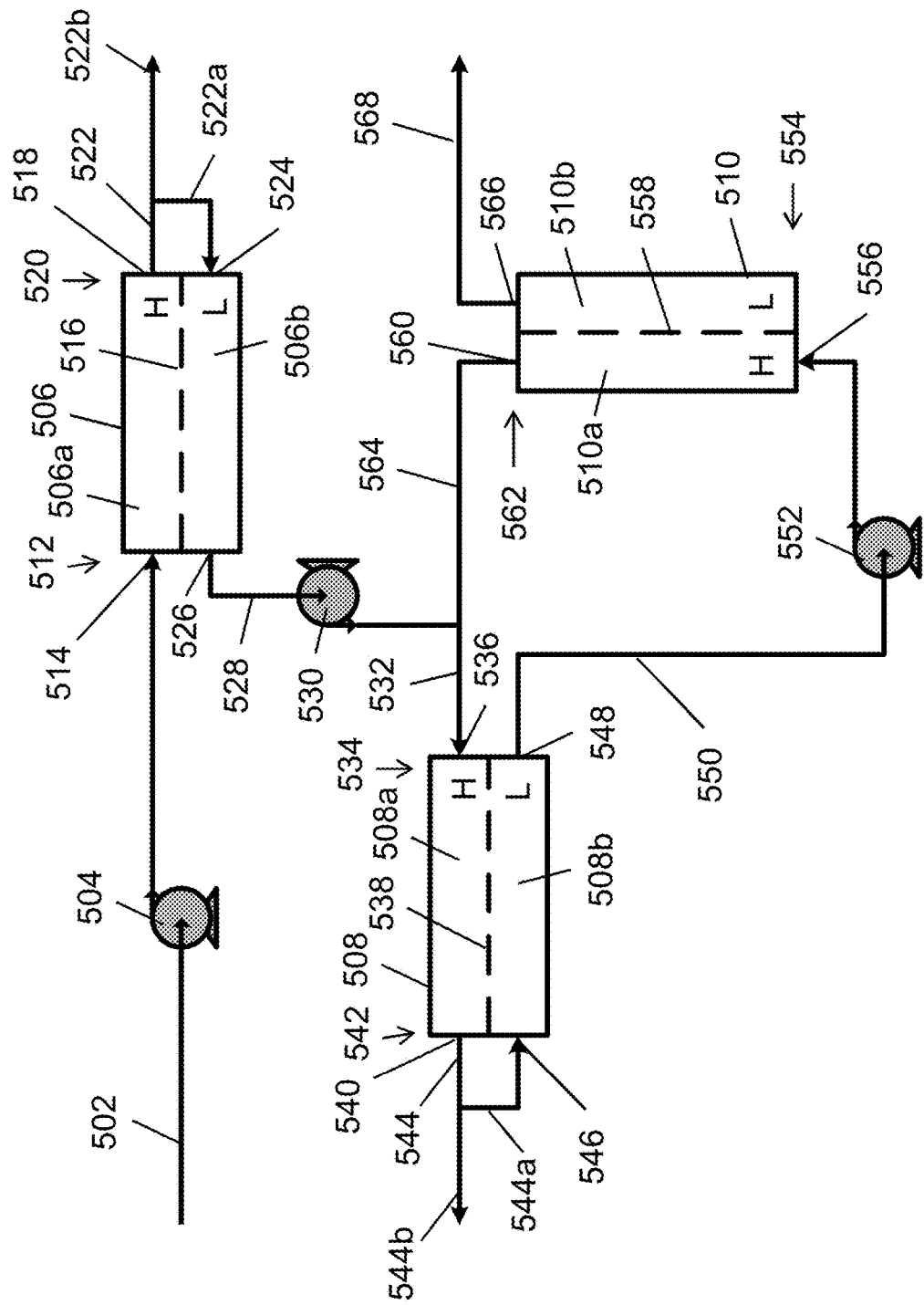
FIG. 1A is a schematic depiction of a first cross-current cascading RO arrangement according to embodiments of the present disclosure.

The present disclosure may be understood more readily by reference to the following detailed description of desired embodiments and the examples included therein. In the following specification and the claims which follow, reference will be made to a number of terms which shall be defined to have the following meanings.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function. Furthermore, it should be understood that the drawings are not to scale.

The singular forms "a," "an," and "the" include plural referents unless the context clearly dictates otherwise.

The term "comprising" is used herein as requiring the presence of the named components/steps and allowing the presence of other components/steps. The term "comprising" should be construed to include the term "consisting of", which allows the presence of only the named components/steps.

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4." More specifically, the term "about" may refer to plus or minus 10% of the indicated number.

The term "liquid" as used herein, and variants thereof, are used to refer to a solvent/solute mixture; and more is not meant unless otherwise specified.

Many terms used herein are relative terms. For example, the terms "inlet" and "outlet" are relative to a direction of flow, and should not be construed as requiring a particular orientation or location for a device. The terms "upstream" and "downstream" are relative to the direction in which a fluid flows through various components, i.e. the fluid flows through an upstream component prior to flowing through the downstream component. It should be noted that in a loop, a first component can be described as being both upstream of and downstream of a second component.

An outlet stream from one side of an osmotic membrane which has an increased concentration of solute compared to its inlet stream may be referred to herein as being a "concentrate" stream. An outlet stream from one side of an osmotic membrane which has a decreased concentration of solute compared to its inlet stream may be referred to herein as a "dilute" solution.

The terms "high pressure" and "low pressure" are used to refer to the pressure on the two sides of the osmotic membrane in a reverse osmosis module. These terms are relative to each other, and do not indicate that the pressure is above or below any particular threshold value.

The term "cascade" or "cascading" as used herein, generally refers to the fact that when the system is operated, dilute solution from the low pressure side of the initial reverse osmosis stage and concentrate solution from the high pressure side of the final reverse osmosis stage both pass through an intermediate reverse osmosis stage.

For reference, normal seawater has a typical salt concentration of about 3.5 wt %. The osmotic pressure of seawater at 25° C. is about 30 atm (441 psi). Fluids with a higher concentration than seawater are commonly referred to as brine.

The present disclosure refers to "reverse osmosis". This term is intended to encompass at least two different types of reverse osmosis, traditional reverse osmosis and osmotically assisted reverse osmosis (OARO). Traditional stages have only one outlet on the low pressure side, do not have solutions with appreciable solute concentrations on the low pressure side (generally less than about 10-20% of the concentration of the solution on the high pressure side), and use different reverse osmosis membranes compared to OARO.

The present disclosure relates to processes for purifying a liquid feed stream using multiple osmotically assisted reverse osmosis stages in a partial cross-current arrangement. The concentrate exiting the high pressure side is used as the draw solution in the low pressure side. This reduces the osmotic pressure differential, allowing the purification of a feed stream containing very high solute concentrations using reverse osmosis at relatively lower driving pressures compared to traditional reverse osmosis processes. Overall system energy consumption is also reduced.

Figure 11:
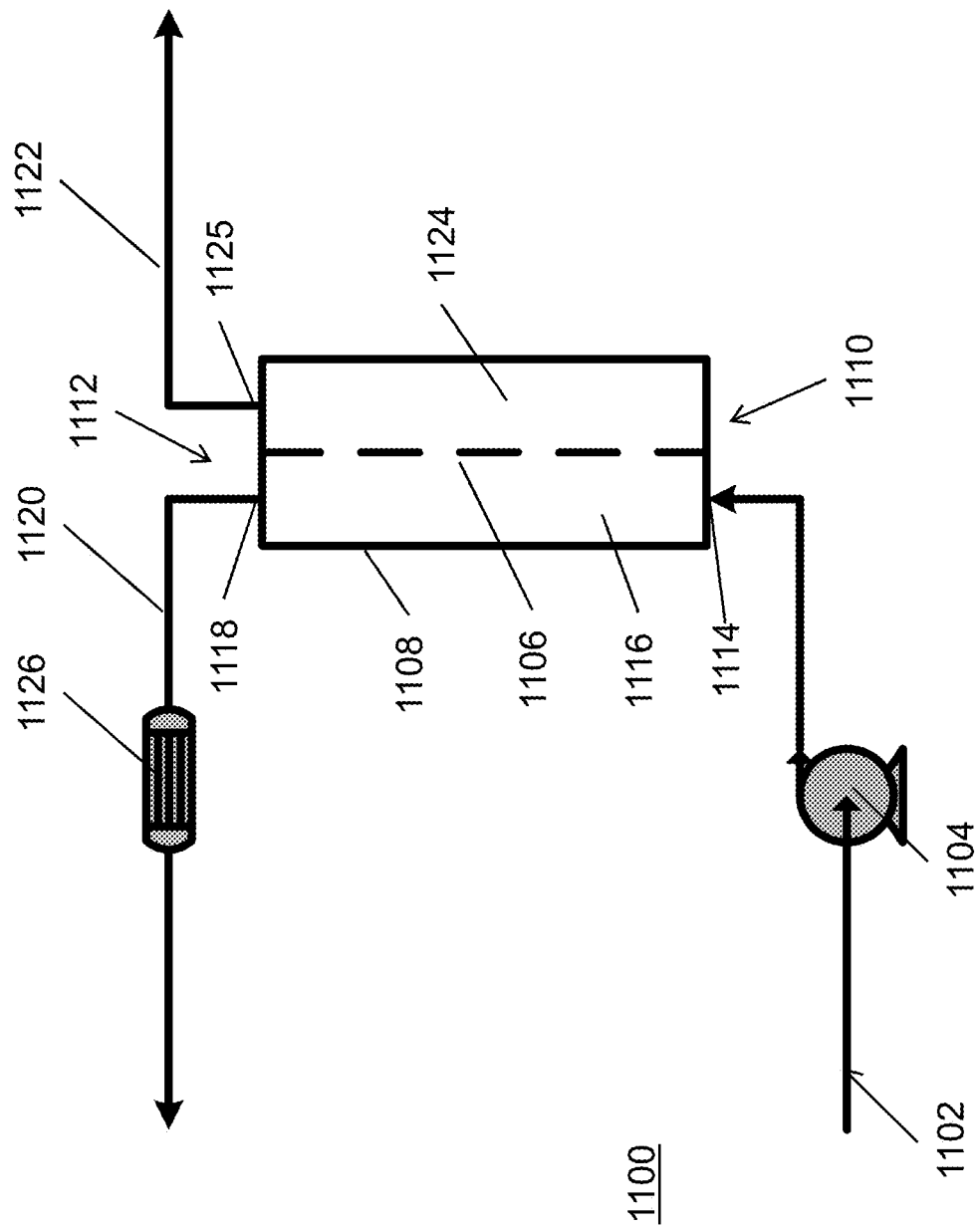
FIG. 11 is a schematic depiction of a traditional reverse osmosis ("RO") process with a single stage and an optional energy recovery device.

To explain the advantages of the systems of the present disclosure, it is helpful to first review conventional systems. FIG. 11 shows a traditional reverse osmosis unit 1100 configured for a typical single stage, non-cascading process. The original feed stream solution to be processed is shown directed into the system via line 1102, with a feed pump 1104 used to apply a driving pressure for driving solvent across a semipermeable membrane 1106 of the reverse osmosis ("RO") stage 1108. The RO stage 1108 has a first end 1110 and an opposing second end 1112. The feed stream 1102 is directed into an inlet 1114 of a high pressure side 1116 of the RO stage that is located on the first end 1110. Concentrate product or stream 1120 is shown as being removed from the high pressure side 1116 via a high pressure side outlet 1118 that is located on the second end 1112. Concentrate product 1120 has a higher solute concentration compared to the feed stream 1102, as a result of solvent transfer through the semipermeable membrane 1106 within the stage 1108. A permeate product 1122 is shown being removed from the low pressure side 1124 of the RO stage 1108 via a low pressure side outlet 1125. The permeate product 1122 is the solvent which has passed through the semipermeable membrane 1106. The term "permeate product" or "permeate" for a given RO system generally refers to the produced liquid stream from the low pressure side 1124 of the RO stage 1108 which has passed through the osmotic membrane 1106 within the stage, and thus which is increased in solvent concentration and reduced in solute concentration, relative to the inlet feed stream 1102.

The traditional RO stage 1108 may include an energy recovery device 1126 that is fed by the high pressure side outlet 1118. The concentrate stream 1120 passes through the energy recovery device 1126. Energy recovery devices are commonly known to be useful in recovering pressure/energy from the liquid stream passing through them.

It is common to use traditional RO units, such as reverse osmosis stage 1108, in conjunction with multiple stages, whereby the concentrate solution and/or permeate solution is discharged from an initial RO stage and subsequently fed through multiple intermediate stages to achieve increased separation efficiencies. One such system is illustrated as system 1200 in FIG. 12, wherein the RO stage 1108 is a final stage which generates permeate product 1122 that is removed at outlet 1125. Concentrate solution 1120 is recycled from outlet 1118 into multiple intermediate RO units which are upstream from the traditional RO unit 1108.

Figure 12:
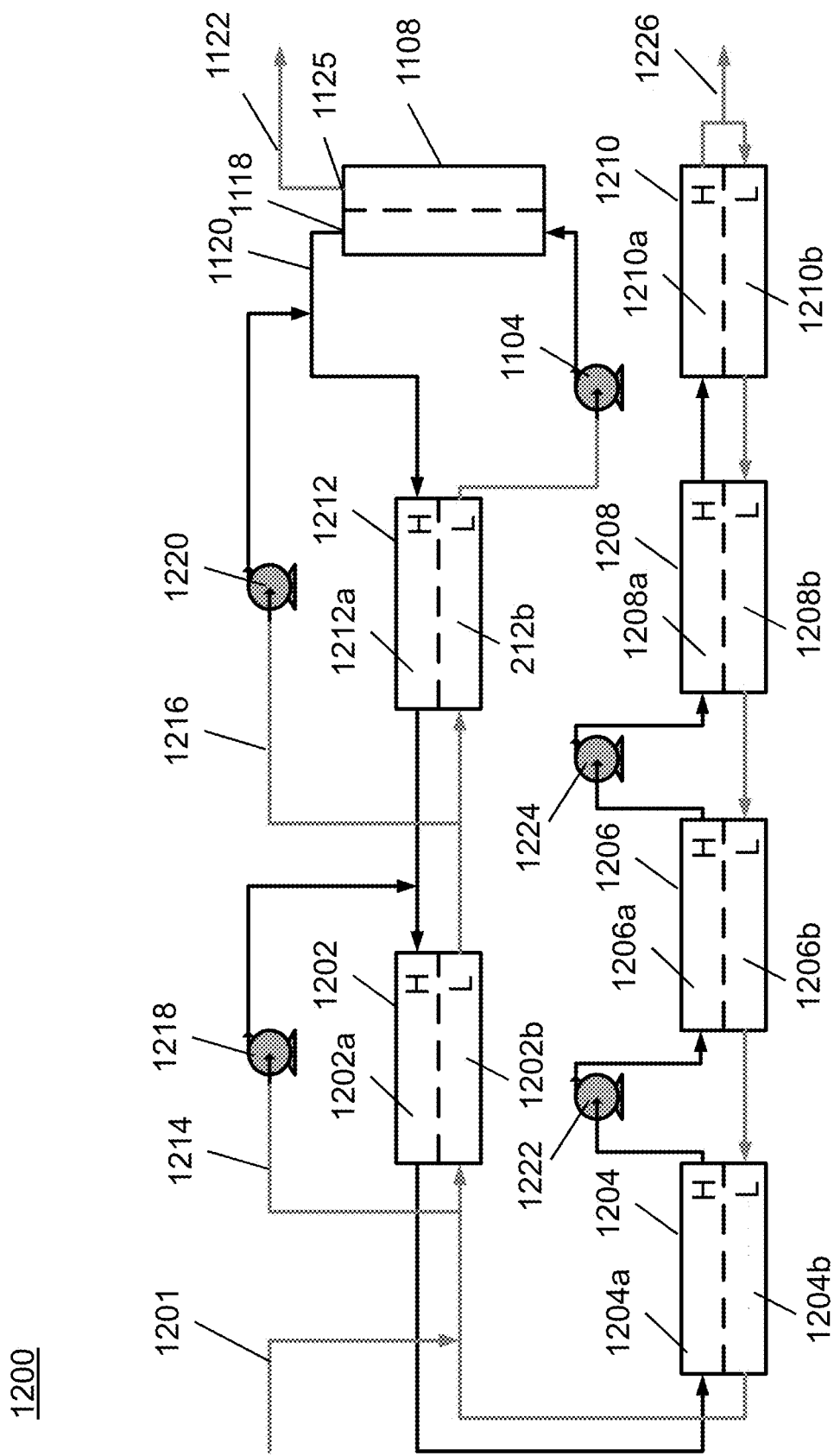
FIG. 12 is a schematic depiction of an existing cascading RO arrangement with multiple osmotically assisted reverse osmosis stages.

FIG. 12 illustrates multiple OARO stages, including an initial OARO stage 1202 having a high pressure side 1202a and a low pressure side 1202b. Intermediate OARO stages include OARO stage 1204 having a high pressure side 1204a and a low pressure side 1204b, OARO stage 1206 having a high pressure side 1206a and a low pressure side 1206b, OARO stage 1208 having a high pressure side 1208a and a low pressure side 1208b, OARO stage 1210 having a high pressure side 1210a and a low pressure side 1210b, and RO stage 1212 having a high pressure side 1212a and a low pressure side 1212b. The original feed stream to be processed is shown directed into the system via line 1201. The system includes bypasses 1214, 1216 with associated bypass pumps 1218, 1220, which permit fluid flow from the low pressure side to the high pressure side. The system of FIG. 12 also includes interstage or booster pumps 1222, 1224. A final concentrate (i.e. waste) product is output at line 1226. The bypass and feed locations are selected so that for every location where streams are mixed, the individual streams have similar concentrations so as to improve process efficiency. Thus, FIG. 12 illustrates a complex multiple stage membrane system, requiring multiple valves, bypasses, and plumbing, all of which complicate operation of the system, particularly during startup and upset processes.

Figure 13:
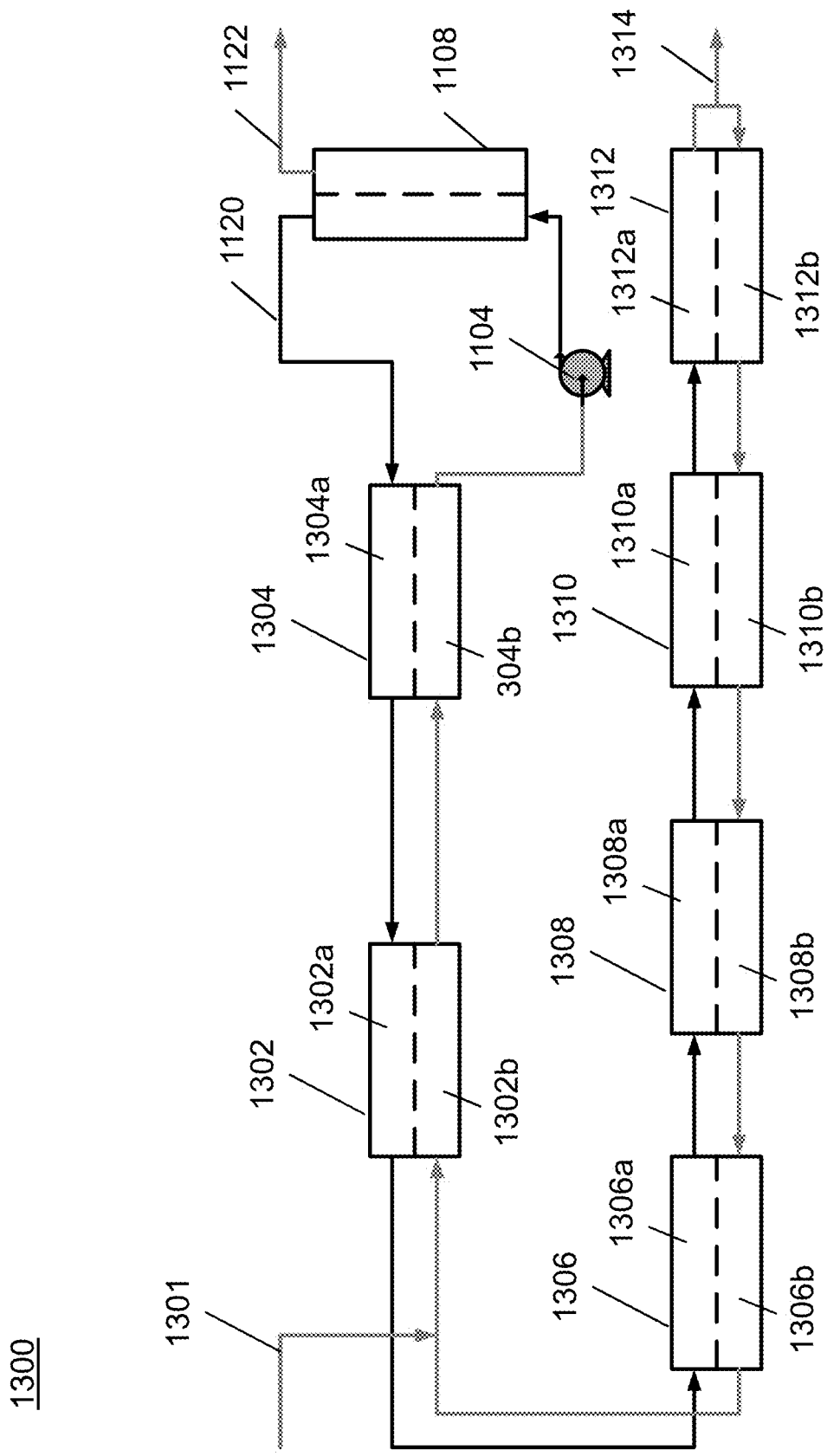
FIG. 13 is a schematic depiction of another existing cascading RO arrangement with multiple osmotically assisted reverse osmosis stages.

FIG. 13 illustrates another existing system 1300 which includes a traditional RO stage 1108 is used to remove final permeate product 1122 and recycle concentrate solution 1120 back into multiple OARO stages. The original feed stream to be processed is shown directed into the system via line 1301. As shown in FIG. 13, system 1300 includes an initial OARO stage 1302 having a high pressure side 1302a and a low pressure side 1302b. Intermediate OARO stages include OARO stage 1304 having a high pressure side 1304a and a low pressure side 1304b, OARO stage 1306 having a high pressure side 1306a and a low pressure side 1306b, OARO stage 1308 having a high pressure side 1308a and a low pressure side 1308b, OARO stage 1310 having a high pressure side 1310a and a low pressure side 1310b, and OARO stage 1312 having a high pressure side 1312a and a low pressure side 1312b. System 1300 can generally be referred to as a conventional cascade of osmotically assisted reverse osmosis stages. In this setup, the highest pressure is maintained at the traditional RO stage 1108, so that only one pump 1104 is required. Feed 1301 is again added at the stage where the concentration is nearest to the feed concentration, and added on the low pressure side. To forgo the need for interstage pumps, the recirculating volume is kept high so that the flux in any one stage will not cause a large change in the osmotic pressure differential. Accordingly, FIG. 13 illustrates another example of an existing, complex cascading layout of multiple osmotically assisted reverse osmosis stages which requires a high recirculating volume.

Figure 14:
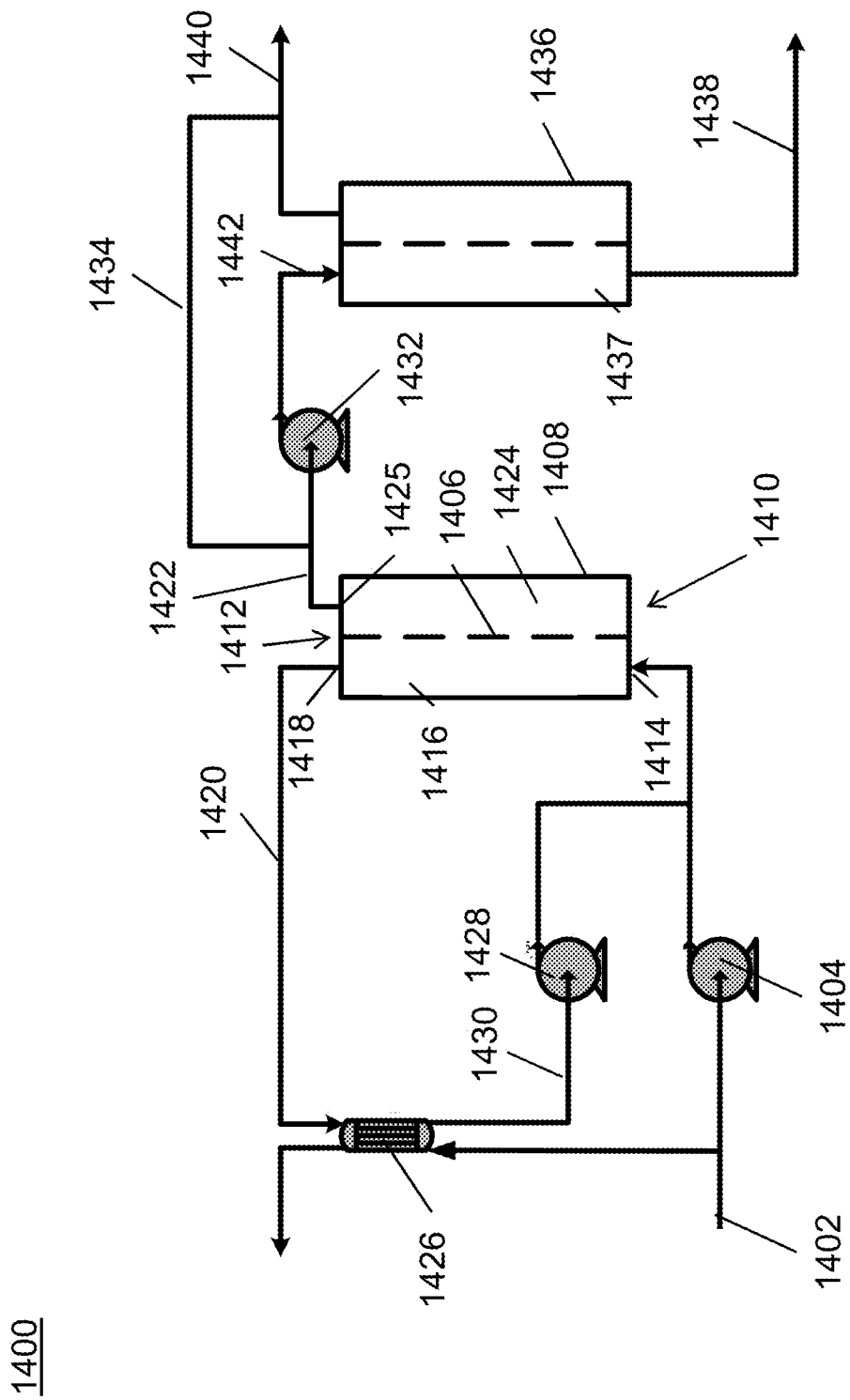
FIG. 14 is a schematic depiction of an existing two-stage reverse osmosis system commonly used in seawater desalination plants for removal of contaminants having low rejection by membranes.

Finally, FIG. 14 illustrates a two-stage reverse osmosis system 1400 representative of existing seawater desalination plants used for removal of contaminants, such as boron, having low rejection by typical semipermeable membranes. The original feed stream to be processed enters the system via line 1402. The feed stream 1402 is split in two, with one stream pressurized by feed pump 1404 and entering the first end 1410 of the first RO stage 1408 via inlet 1414 on the high pressure side 1416. The other half is pressurized in an isobaric pressure exchanger 1426 by the reject concentrate 1420 output at the second end 1412 of the first RO stage 1408 via outlet 1418 on the high pressure side 1416. A booster pump 1428 pressurizes a portion 1430 of reject concentrate 1420 split at the isobaric pressure exchanger 1426 before being mixed with the feed stream pressurized by feed pump 1404. A permeate 1422 passes through membrane 1406 and exits the low pressure side 1424 of the first RO stage 1408 via second end outlet 1425. Permeate solution 1422 is then split into bypass stream 1434, which is to be removed with the final permeate or permeate product 1440, and feed stream 1442 which is pressurized by second stage pump 1432 to be received by the high pressure side 1437 of a second RO stage 1436. Second RO stage 1436 has substantially the same configuration as first RO stage 1408, with a final reject concentrate solution being output at 1438. The two-stage reverse osmosis illustrated in FIG. 14 is known to operate at high system pressures and achieve low recovery of the final permeate product.

The improved reverse osmosis systems of the present disclosure, and variations therein, are illustrated in various embodiments in FIGS. 1A-1C, FIGS. 2A-2B, FIGS. 3A-3B, and FIGS. 4-8.

Referring first to FIG. 1A, reference numeral 500 indicates, generally, the system and process having a staged, partially cascading cross-current arrangement for desalinating or purifying a liquid feed stream. The original feed stream to be processed is shown directed into the system via line 502, with a feed pump 504 included for applying pressure to the feed stream. The feed stream can be aqueous or organic, but generally contains low suspended solids and elevated dissolved solids. System 500 includes an initial osmotically assisted reverse osmosis stage 506, an intermediate section containing at least one intermediate osmotically assisted reverse osmosis stage 508, and a final reverse osmosis ("RO") stage 510. Each stage 506, 508, and 510 generally includes a semipermeable membrane separating a high pressure side and a low pressure side, and a first end and a second end opposing the first end. The membrane can be any membrane known in the art to be useful for solution separation, such as those commonly used for reverse osmosis, forward osmosis, pressure retarded osmosis, or pressure assisted osmosis. As illustrated here, the flow through the high pressure side is counter-current to the flow through the low pressure side.

The first or initial OARO stage 506 receives the feed stream 502 at a first end 512 and on the high pressure side 506a via inlet 514. The feed pump 504 pressurizes feed stream 502 to drive solvent across the semipermeable membrane 516, from the high pressure side 506a to the low pressure side 506b of the initial osmotically assisted reverse osmosis stage 506. An outlet 518 on the high pressure side 506a at the second end 520 of the initial osmotically assisted reverse osmosis stage 506 outputs a yield stream 522. The yield stream 522 is split into two streams, a recycle stream 522a and a concentrate stream 522b. Concentrate stream 522b is removed from the system as a concentrate product or as waste. The area of the membrane 516 can be sized to achieve a desired solute concentration on the high pressure side 506a before concentrate stream 522b is removed as a concentrate product. The recycle stream 522a is introduced into the low pressure side 506b via inlet 524 at the second end 520 of the initial osmotically assisted reverse osmosis stage 506, where it is mixed with the permeate which has crossed membrane 516. This mixture of permeate and concentrate exits the low pressure side 506b via outlet 526 at the first end 512 of the initial reverse osmosis stage 506, and is referred to as a diluted stream 528.

By sending the concentrate product of recycle stream 522a back into the low pressure side 506b, the osmotic pressure differential across membrane 516 is reduced. As a result, lower pressure is required to achieve pure water flux compared with traditional RO processes. The solute concentration of the diluted stream 528 leaving the low pressure side 506b of the initial osmotically assisted reverse osmosis stage 506 is diluted relative to the feed stream 502. The level of dilution dictates the maximum osmotic pressure differential in the initial osmotically assisted reverse osmosis stage 506. The maximum osmotic pressure differential can occur at any point along the membrane 516, but generally occurs beginning near the middle of the membrane up to the area adjacent the outlet 518. The maximum osmotic pressure differential and the point where the maximum differential occurs along the length of the membrane can be controlled by the amount of the yield stream 522 which is split and reintroduced as recycle stream 522a into the low pressure side 506b. Note that the absolute amount of solute remaining in the system is reduced, due to the removal of solute via concentrate stream 522b.

The diluted stream 528 leaving the low pressure side 506b of the initial osmotically assisted reverse osmosis stage 506 is fed to an intermediate section. Here, the diluted stream 528 is first pressurized by an interstage pump 530 and then fed as part of a feed stream 532 into the intermediate osmotically assisted reverse osmosis stage 508, which is the entire intermediate section in FIG. 1A. In particular, feed stream 532 is received in the high pressure side 508a via inlet 536 located at a first end 534. The interstage pump 530 pressurizes feed stream 532 to drive solvent across the osmotic membrane 538, from the high pressure side 508a to the low pressure side 508b of the intermediate reverse osmosis stage 508. An outlet 540 on the high pressure side 508a at the second end 542 of the intermediate reverse osmosis stage 508 outputs a concentrate product as yield stream 544. Again, the yield stream 544 is split into a recycle stream 544a and a concentrate stream 544b. Concentrate stream 544b is removed from the system as a concentrate product or as waste. The recycle stream 544a is reintroduced into the low pressure side 508b of the intermediate osmotically assisted reverse osmosis stage 508 via inlet 546, located at the second end 542, where it is mixed with the permeate which has crossed membrane 538. This mixture of permeate and concentrate solution, is referred to generally as an exit stream 550, is output from the low pressure side 508b of the intermediate osmotically assisted reverse osmosis stage 508 via outlet 548 at the first end 534. Similar to the initial osmotically assisted reverse osmosis stage 506, by sending the recycle stream 544a back into the low pressure side 508b, the osmotic pressure differential across membrane 538 is reduced.

The exit stream 550 leaving the low pressure side 508b of the intermediate reverse osmosis stage 508 also represents a purified stream exiting the intermediate section of the system. As will be seen further herein, multiple osmotically assisted reverse osmosis stages may be present in the intermediate section. Generally, the intermediate section receives the diluted stream 528 from the initial osmotically assisted reverse osmosis stage, and outputs a purified stream 550.

Continuing, the exit stream/purified stream 550 is pressurized by a final pump 552 and is fed into the final reverse osmosis stage 510. The pump 552 applies the pressure required to drive solvent across the osmotic membrane 558 of the final RO stage 510. The purified stream 550 is received on the high pressure side 510a via inlet 556 located at a first end 554 of the final RO stage 510. Ideally, the solute concentration of the purified stream 550 is so low that the final stage 510 can be operated at a pressure that is lower than that of the initial stage 506 or the intermediate stage 508. An outlet 560 of the high pressure side 510a located at the second end 562 of the RO stage 510 outputs a concentrate labeled as reject stream 564, which is recycled as a feed to the intermediate osmotically assisted reverse osmosis stage 508 as part of feed stream 532. The reject stream 564 desirably has a solute concentration about equal to the solute concentration of diluted stream 528 leaving the low pressure side 506b of the initial osmotically assisted reverse osmosis stage 506. For purposes of this disclosure, an "about equal" concentration is obtained when the solute concentration of the diluted stream 528 divided by the solute concentration of the reject stream 564 is from 0.5 to 2. Of course, the liquid streams may contain more than one solute, and this comparison can be performed for any solute. A small portion of stream 560 may also be recycled back to the low pressure side 510b to slightly decrease the osmotic pressure differential in the final reverse osmosis stage 510. Recycling a small portion of stream 560 in the low pressure side 510b also serves to effectively 'cremineralize' the purified stream 568.

A final permeate product 568 is removed from the final RO stage 510 on the low pressure side 510b via outlet 566. The permeate product 568 is the final purified solvent (e.g., water) which has passed through the initial stage 506, the intermediate stage 508, and the final stage 510. As seen here, in all stages except the final stage, the output from the high pressure side is used as the input to the low pressure side, and the concentrate stream removes solute from the system.

Figure 1B:
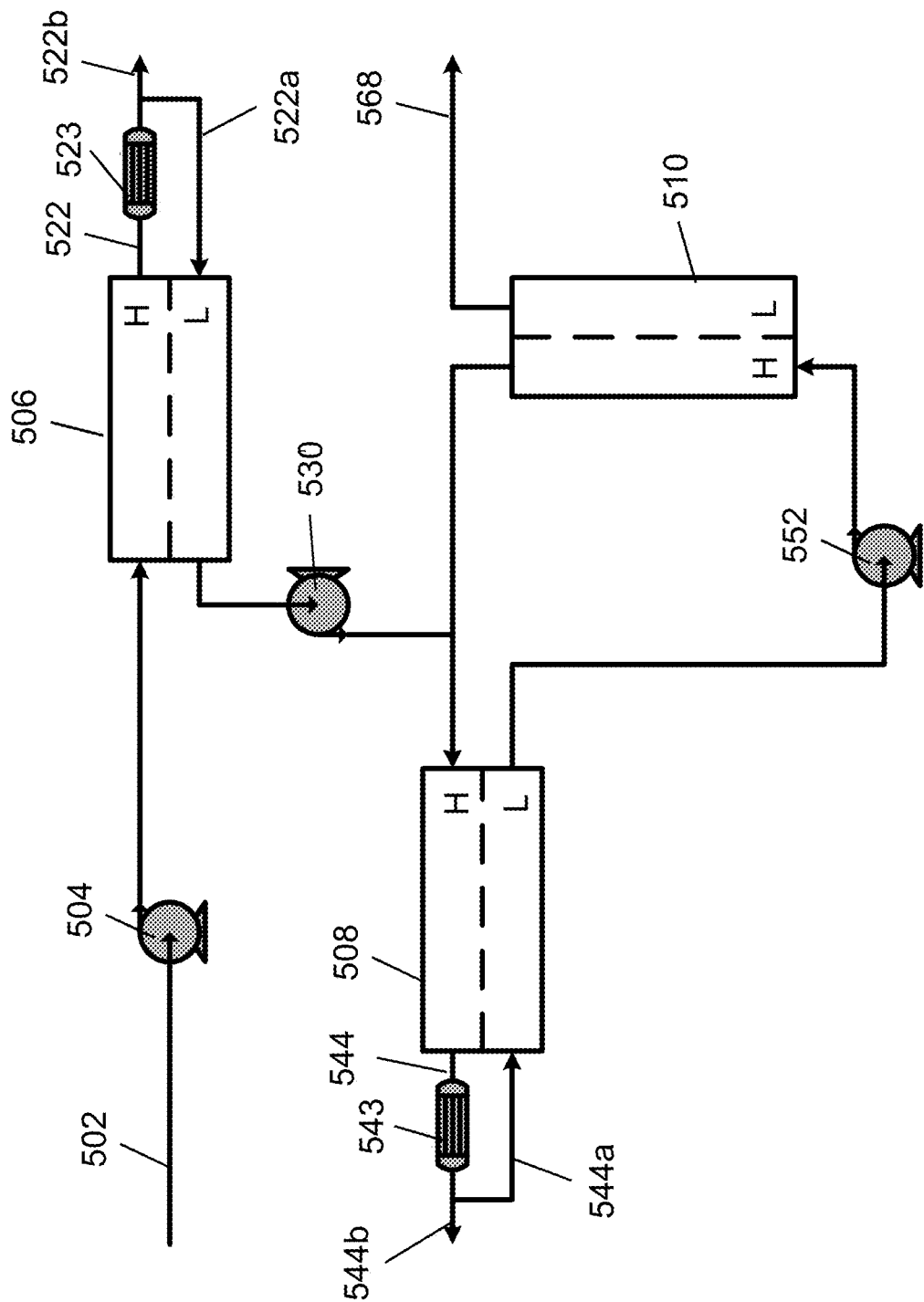
FIG. 1B is a schematic depiction of the cross-current cascading RO arrangement of FIG. 1A including energy recovery devices at various stages.

Referring now to FIG. 1B, the same system of FIG. 1A is present, including feed stream 502, feed pump 504, initial OARO stage 506, interstage pump 530, intermediate OARO stage 508, final pump 552, and final RO stage 510 resulting in final permeate 568. Here, after each stage that results in an output stream exiting the system (i.e. yield streams 522, 544), an energy recovery device 523, 543 is present. This permits recovery of energy from the output stream, and can be a pressure recovery device, or a generator, or a valve.

Figure 1C:
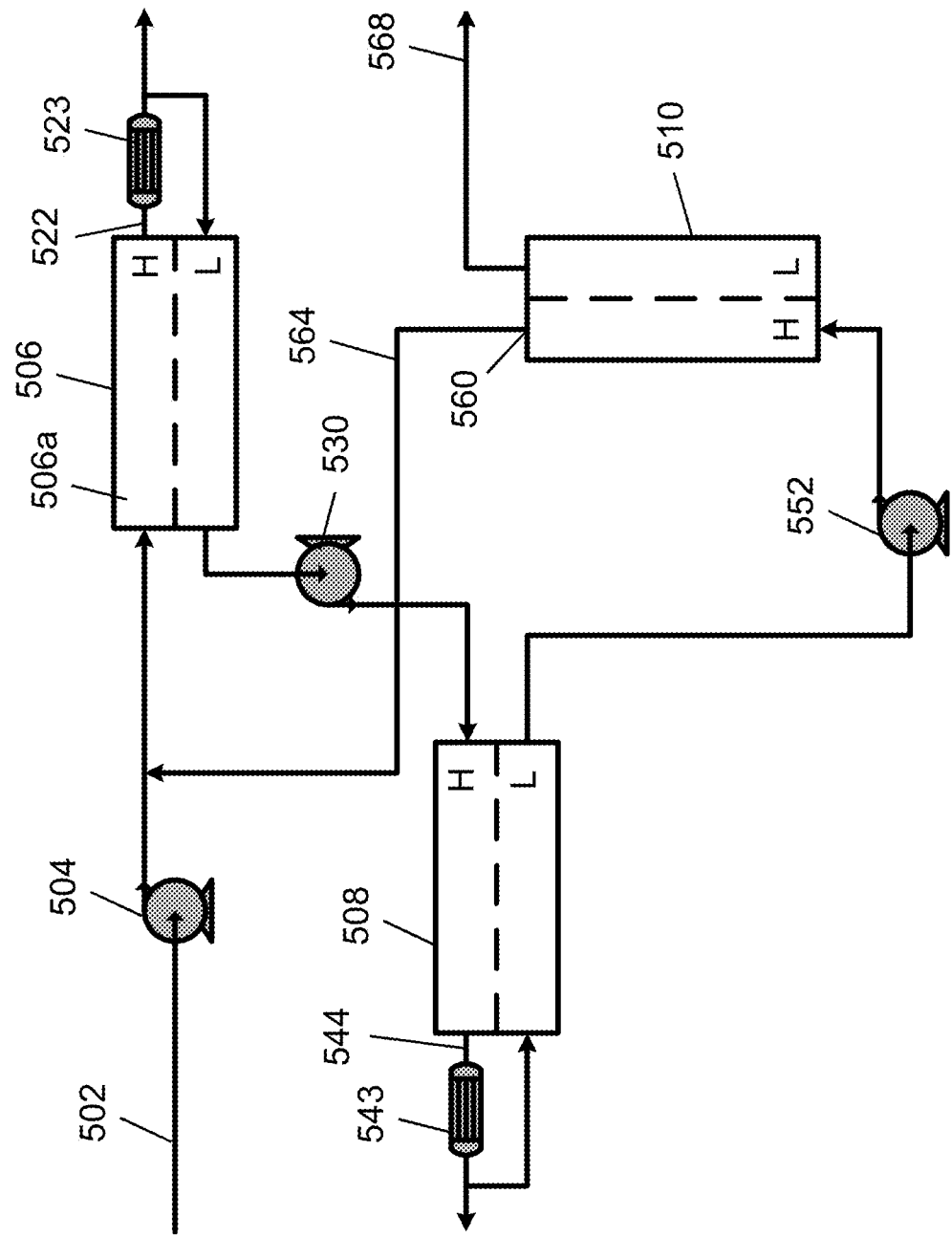
FIG. 1C is a schematic depiction of a second cross-current cascading RO arrangement according to embodiments of the present disclosure. Here, the reject stream of the final stage is recycled to the initial stage instead of to the intermediate section.

The system illustrated in FIG. 1C is similar to the systems illustrated in FIG. 1A and FIG. 1B and includes feed stream 502, feed pump 504, initial OARO stage 506, interstage pump 530, intermediate OARO stage 508, final pump 552, final RO stage 510 resulting in final permeate 568, and an energy recovery device 523, 543 after yield streams 522, 544. Here, the outlet 560 of the final RO stage 510 outputs the concentrate labeled as reject stream 564, which is recycled as a feed to the initial OARO stage 506 as part of feed stream 502. As a result, the final RO stage 510 reject stream 564 is effectively recycled into any other stage that may be arranged in the system, including but not limited to the initial RO stage 506 and intermediate OARO stage 508. The reject stream 564 desirably has a solute concentration about equal to the solute concentration of feed stream 502 entering the high pressure side 506a of the initial osmotically assisted reverse osmosis stage 506.

The overall effect of the system 500 is a reduction of peak system pressure, higher energy efficiency, and higher recovery of concentrate product and/or permeate product than traditional RO systems. The reduction in system pressure is advantageous because high pressure is known in RO systems to exacerbate membrane fouling by compaction of solids or precipitates into the membrane surface. Additionally, at lower pressures, pump costs may be reduced. Lower pressures may also permit the use of lighter pump materials, potentially leading to human-portable or human operated seawater desalination systems. Higher recovery is advantageous because in any separation process using membranes, pre-treatment costs to protect the membranes from fouling are significant, and a higher recovery generally translates to less volume of feed liquid (e.g., water) that requires pre-treatment.

These benefits can be further obtained by forming each stage in the system using multiple OARO modules. Some different embodiments of the present disclosure are illustrated in FIG. 2A and FIG. 2B.

Figure 2A:
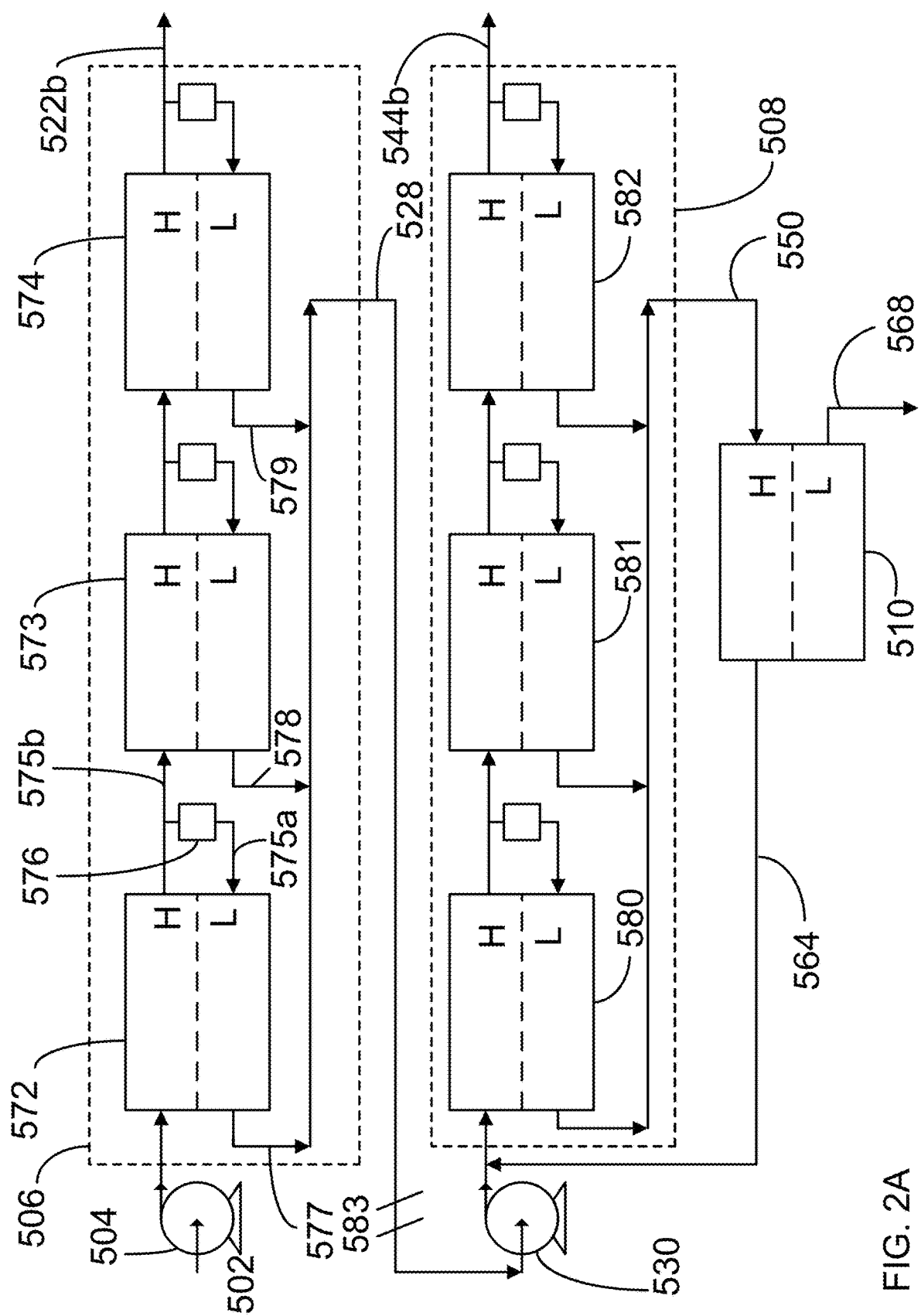
FIG. 2A is a schematic depiction showing a first arrangement of osmotically assisted reverse osmosis modules within an osmotically assisted reverse osmosis stage, according to the present disclosure. Here, the diluted streams of individual modules are combined into a single larger diluted stream.
Figure 2B:
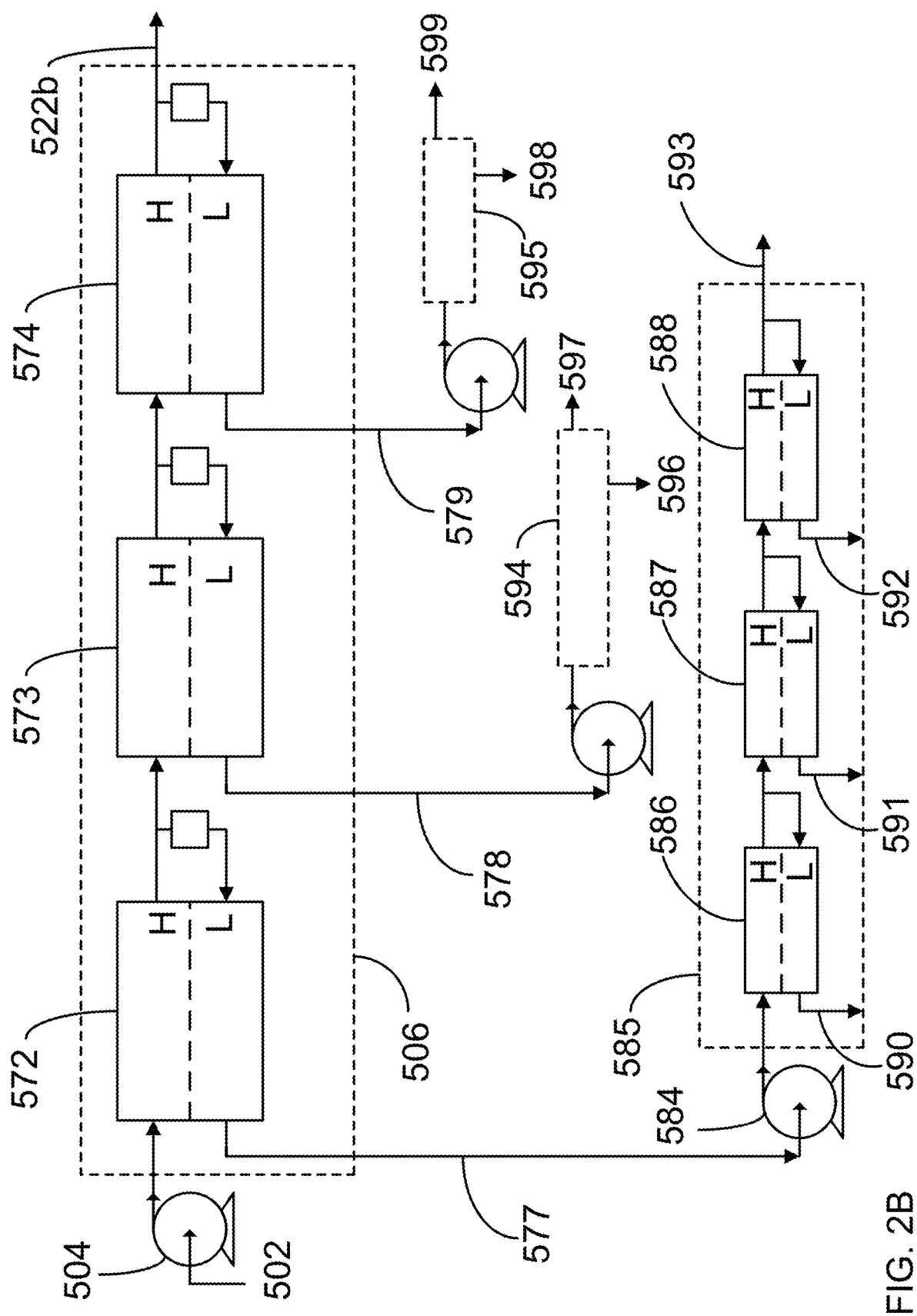
FIG. 2B is a schematic depiction showing a second arrangement of osmotically assisted reverse osmosis modules within an osmotically assisted reverse osmosis stage, according to the present disclosure. Here, the diluted streams of individual modules are separately further processed into further diluted streams and concentrate streams.

FIG. 2A illustrates osmotically assisted reverse osmosis stages that can be arranged in a network, where the retentate and permeate from each stage are directed to a separate stage for further treatment until the retentate stream is brought to a desired concentration.

Referring now to FIG. 2A, one or more stages are illustrated, where each stage includes multiple osmotically assisted reverse osmosis ("OARO") modules. The system includes an initial osmotically assisted reverse osmosis stage 506, an intermediate section 508, and a final reverse osmosis stage 510, similar to that of FIGS. 1A-1C. The initial stage 506 is shown as being made up of a plurality of OARO modules (here, three, 572, 573, 574), which are arranged in series. Similarly, the intermediate section 508 is shown as being made up of a plurality of OARO modules 580, 581, 582, which are also arranged in series. The high pressure sides are indicated with the letter "H", and the low pressure sides are indicated with the letter "L".

As illustrated here, feed stream 502 is pressurized by feed pump 504 and then sent into the high pressure side of the initial stage, and here into the high pressure side of the first initial OARO module 572. The yield stream exiting the high pressure side of first initial OARO module 572 is split into two streams, a recycle stream 575a and a concentrate stream 575b. The concentrate stream 575b is used as the feed into the second initial OARO module 573. The recycle stream 575a passes through an energy recovery device 576. Again, the energy recovery device can be a pressure recovery device, or a generator, or a valve. The recycle stream 575a is then introduced into the low pressure side of the first initial OARO module. A first exit stream 577 leaves the low pressure side of the first initial OARO module 572.

Similarly, a second exit stream 578 leaves the low pressure side of the second initial OARO module 573, and a third exit stream 579 leaves the low pressure side of the third initial OARO module 574. In this embodiment, the three exit streams 577, 578, 579 of all of the modules are combined into a single stream that forms the diluted stream 528 which is the output of the low pressure side of the initial stage 506. The concentrate stream exiting the third initial OARO module 574 forms the concentrate stream 522b which is the output of the high pressure side of the initial stage 506.

Continuing, the diluted stream 528 is pressurized by interstage pump 530 and then passes through intermediate section 508. Similar to the initial stage, the exit streams leaving the low pressure side of the intermediate OARO modules 580, 581, 582 are combined into a single stream that forms the purified stream 550 which is the output of the low pressure side of the intermediate section 508. The concentrate stream exiting the third intermediate OARO module 582 forms the concentrate stream 544b which is the output of the high pressure side of the intermediate section 508. It is noted that the intermediate section can contain as many stages as desired, as indicated by the double lines 583.

Finally, the purified stream 550 enters the high pressure side of the final stage 510, and the reject stream 564 exits the high pressure side of the final stage. Here, the reject stream 564 is recycled as a feed to the intermediate section 508. The final permeate stream 568 exits the low pressure side of the final stage 510. The final permeate stream 568 is the final purified solvent (e.g., water). The concentrate streams 522b, 544b remove solute from the system.

FIG. 2B shows a different arrangement, which is illustrated here only with respect to the initial osmotically assisted reverse osmosis stage 506, but is otherwise similar to that of FIGS. 1A-1C. Again, the initial stage 506 is made up of a plurality of OARO modules 572, 573, 574, which are arranged in series. The high pressure sides are indicated with the letter "H", and the low pressure sides are indicated with the letter "L".

Feed stream 502 is pressurized by feed pump 504 and then sent into the high pressure side of the initial stage, and here into the high pressure side of the first initial OARO module 572. Fluid flow through the high and low pressure sides is the same as described in FIG. 2A. The relevant part of this figure is where first exit stream 577 leaves the low pressure side of the first initial OARO module 572. Again, a second exit stream 578 leaves the low pressure side of the second initial OARO module 573, and a third exit stream 579 leaves the low pressure side of the third initial OARO module 574.

In this figure though, each exit stream 577, 578, 579 is separately processed by a dedicated permeate concentration section. This is illustrated with respect to first permeate concentration section 585. The first exit stream 577 is pressurized by an interstage pump 584, and then fed through one or more osmotically assisted reverse osmosis (OARO) modules which are connected in series through their high pressure sides. Here, three OARO modules 586, 587, 588 are present in first permeate concentration section 585. The fluid flowing through the high pressure side of the permeate concentration section exits as concentrate stream 593. The fluid flowing through the low pressure sides of each OARO module exit as permeate streams 590, 591, 592, which are diluted with respect to the input stream 577. The permeate streams 590, 591, 592 can be combined into a single stream, or further processed as separate streams.

Second permeate concentration section 594 processes the second exit stream 578, and third permeate concentration section 595 processes the third exit stream 579. These permeate concentration sections operate in the same manner, and have the same structures, as those described for the first permeate concentration section 585. The output of the second permeate concentration section 594 is concentrate stream 597 (from the high pressure side) and permeate stream 596 (from the low pressure side). The output of the third permeate concentration section 595 is concentrate stream 599 and permeate stream 598. The various permeate streams 590, 591, 592, 596, 598 can be combined into a single stream, which corresponds to diluted stream 528 in FIG. 2A. Similarly, the various concentrate streams 522b, 593, 597, 599 can also be combined into a single stream.

Figure 3A:
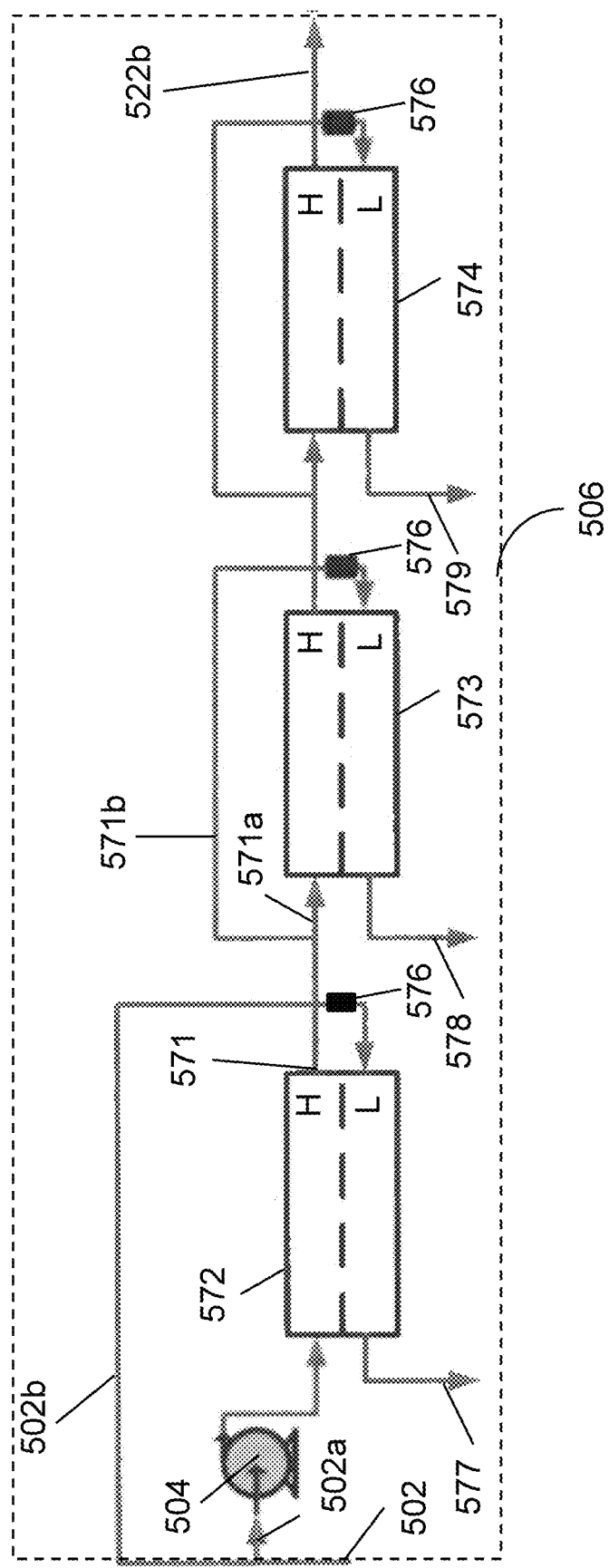
FIG. 3A is a schematic depiction showing a third arrangement of osmotically assisted reverse osmosis modules within an osmotically assisted reverse osmosis stage, according to the present disclosure. Here, the feed stream of each module is broken into two streams, which feed both the high pressure side and the low pressure side of the module. Here, the fluid flow within each module is counter-current.
Figure 3B:
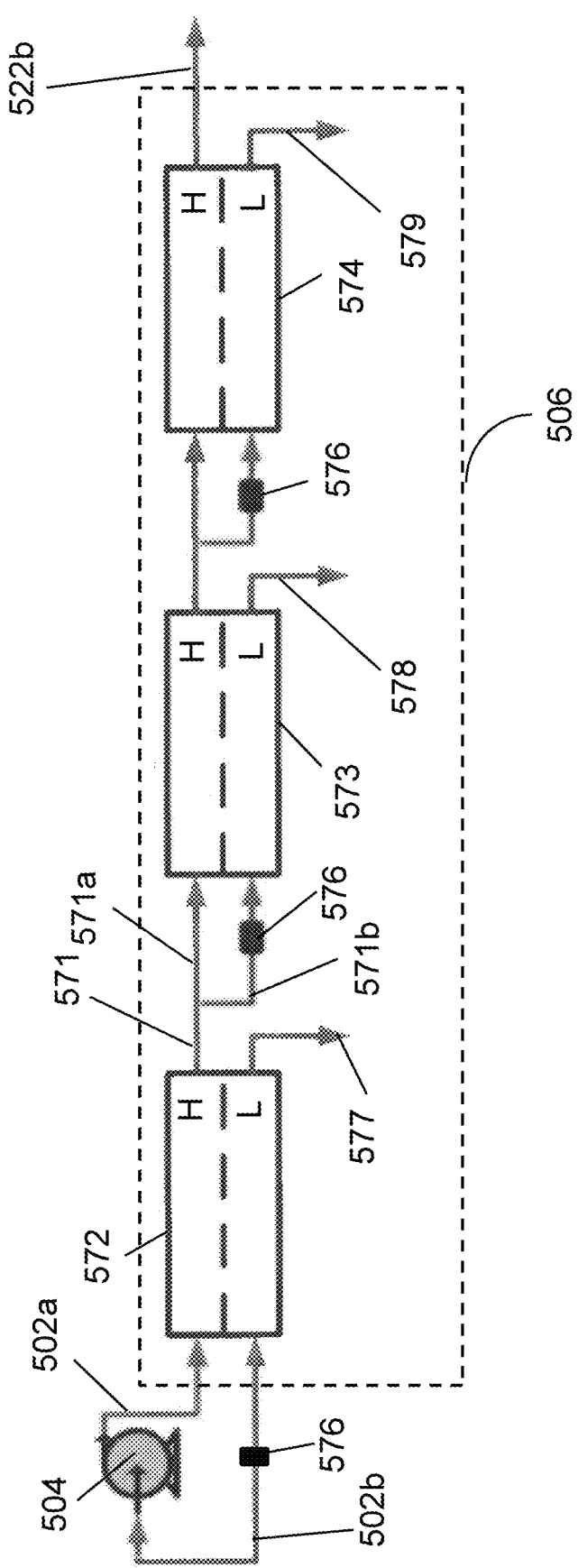
FIG. 3B is a schematic depiction showing a fourth arrangement of osmotically assisted reverse osmosis modules within an osmotically assisted reverse osmosis stage, according to the present disclosure. This is similar to FIG. 3A, with the feed stream of each module being broken into two streams, which feed both the high pressure side and the low pressure side of the module. Here, though the fluid flow within each module is co-current.

FIG. 3A and FIG. 3B illustrate further arrangements of osmotically assisted reverse osmosis modules with respect to the initial osmotically assisted reverse osmosis stage 506, though this is also applicable to the intermediate section and the final reverse osmosis stage. Here, the feed stream of each module is broken into two streams, which feed both the high pressure side and the low pressure side of the module. Here, the fluid flow within each module is counter-current. The original liquid feed stream to be processed is directed into the system via line 502. The liquid feed stream 502 is split into a feed input stream 502a and a feed bypass stream 502b. The feed input stream 502a is then pressurized by feed pump 504, whereas the feed bypass stream 502b is not pressurized. The feed input stream 502a is fed into the high pressure side ("H") of the first OARO module 572. The feed bypass stream 502b is fed into the low pressure side ("L") of the first OARO module 572. A diluted exit stream 577 exits the low pressure side of the first OARO module 572. A yield stream 571 exits the high pressure side of the first OARO module 572. The yield stream 571 acts as a feed stream to the second OARO module 573, and is split into a feed input stream 571a and a feed bypass stream 571b. Again, the feed input stream 571a is fed into the high pressure side ("H") of the second OARO module 573, and the feed bypass stream 571b is fed into the low pressure side ("L") of the second OARO module. The flows for the third module 574 are not labeled, but are the same as the other two modules. Again, a second exit stream 578 leaves the low pressure side of the second OARO module 573, and a third exit stream 579 leaves the low pressure side of the third OARO module 574. The concentrate stream exiting the third OARO module 574 forms the concentrate stream 522b which is the output of the high pressure side of the initial stage 506. Each feed bypass stream passes through an energy recovery device 576 and is then introduced into the low pressure side of the OARO module.

In FIG. 3A, the fluid flow through each OARO module is counter-current. In FIG. 3B, the fluid flow through each OARO module is co-current.

Figure 4:
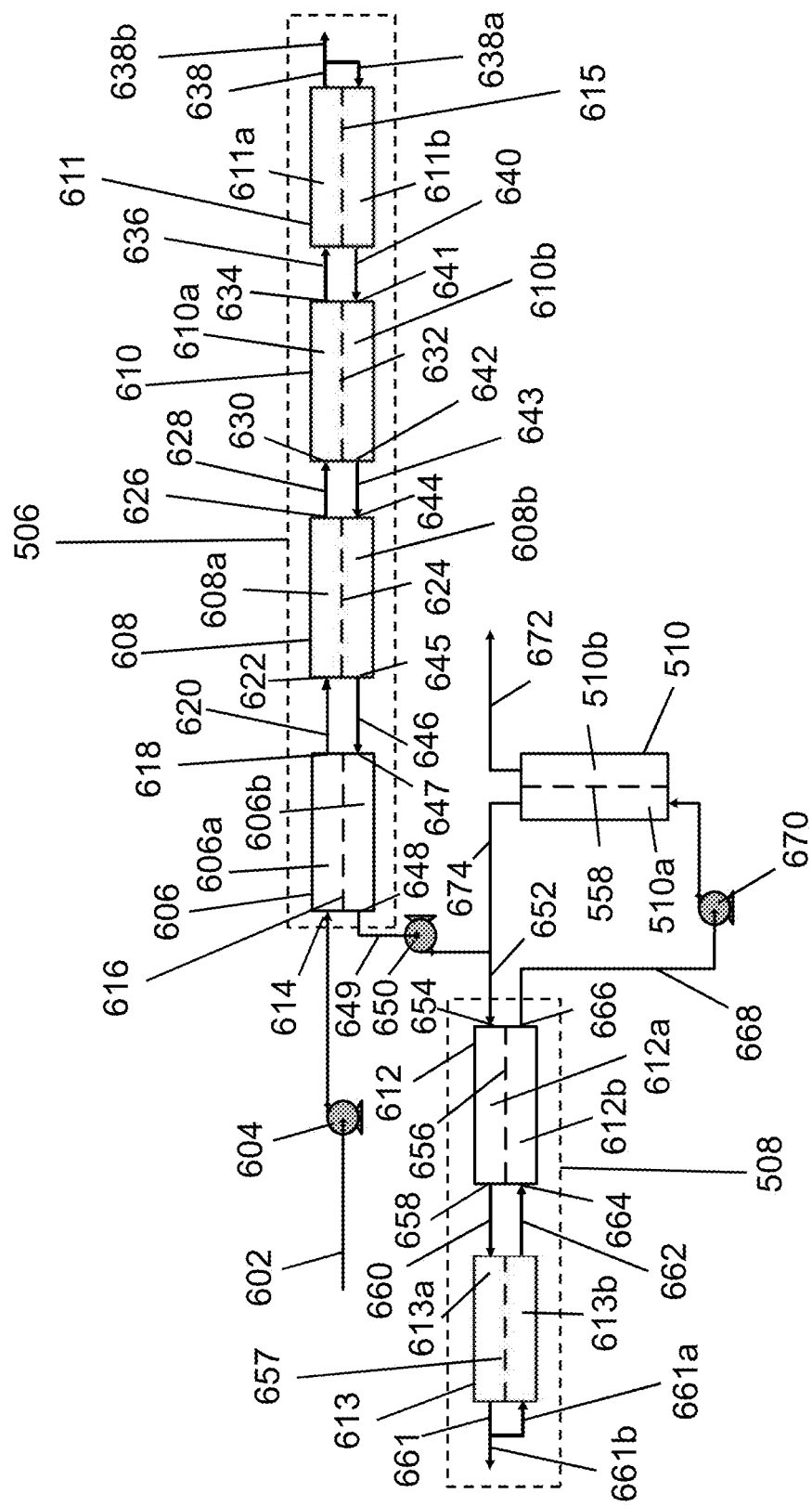
FIG. 4 is a schematic depiction of a cross-current cascading RO arrangement having multiple OARO modules in one or more stages according to embodiments of the present disclosure. Here, the output of the high pressure side of one module is used as the input to the high pressure side of the next module, and the output of the low pressure side of one module is used as the input to the low pressure side of the next module. Flow is counter-current.
Figure 6:
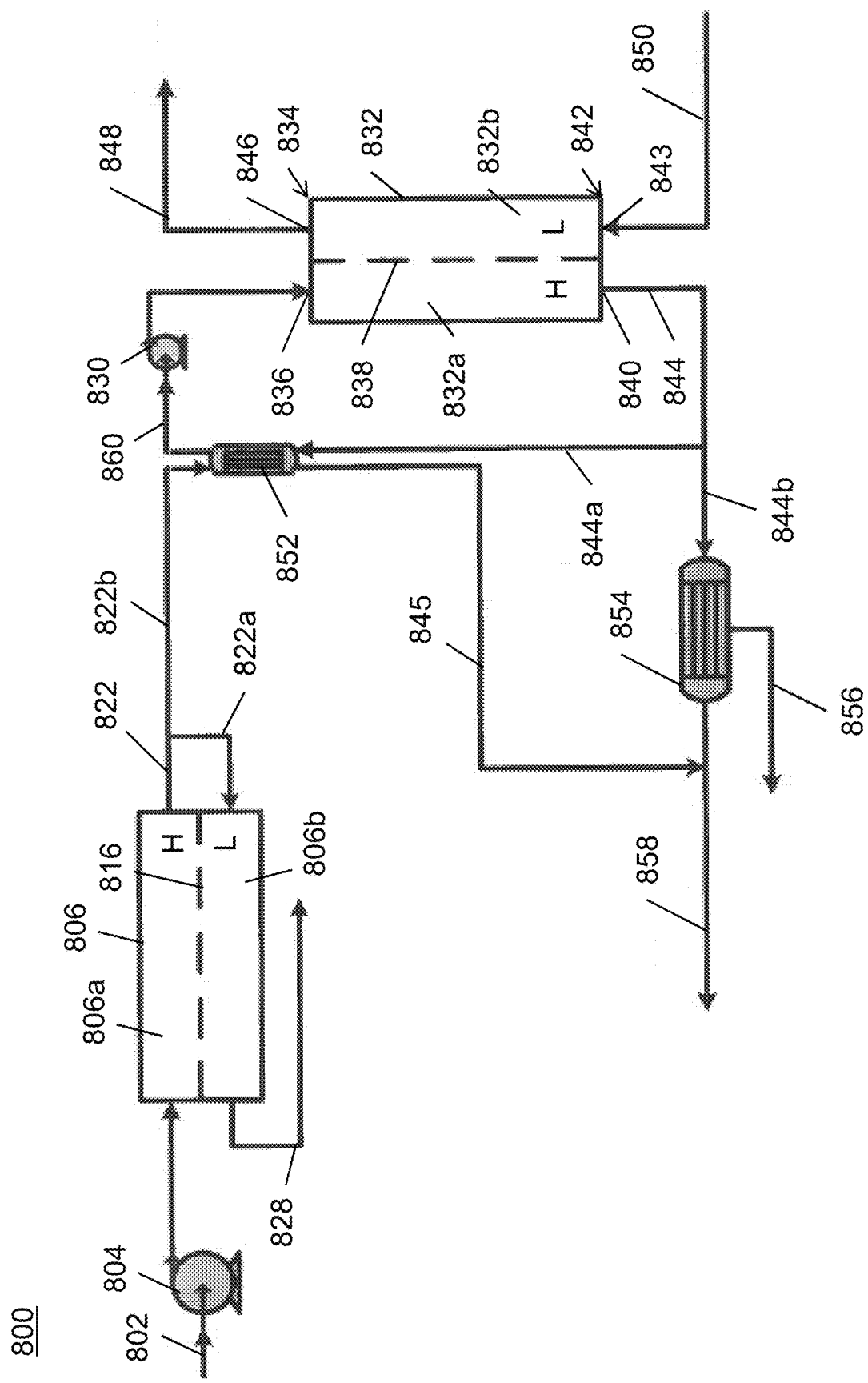
FIG. 6 is a schematic depiction of a cross-current cascading RO arrangement, which illustrates a pressure retarded osmosis (PRO) system according to embodiments of the present disclosure. The PRO system uses the concentrate streams to generate electricity or work from the osmotically assisted reverse osmosis systems described herein.

FIG. 4 shows another embodiment where each stage is formed from multiple OARO modules. Referring to FIG. 4, reference numeral 600 indicates, generally, the system and process having a staged, partially cascading cross-current membrane arrangement for purifying the feed stream with one or more stages, where each stage includes multiple osmotically assisted reverse osmosis ("OARO") modules. The system 600 generally includes an initial osmotically assisted reverse osmosis stage 506 and an intermediate section 508, where each stage can include multiple OARO modules. The system 600 also includes the final reverse osmosis stage 510, which also operates in substantially the same manner as described above in FIG. 1A. The initial stage 506 includes a total of four OARO modules 606, 608, 610, and 611, each having a semipermeable membrane separating a high pressure side and a low pressure side, with the modules being linked together in a counter-current arrangement. The intermediate section is shown as one stage with two OARO modules 612, 613 at an intermediate section, which also has a semipermeable membrane separating a high pressure side and a low pressure side. While the system 600 of FIG. 6 is illustrated with two stages, where the initial stage 506 includes four OARO modules and intermediate stage 508 includes two OARO modules, these numbers are only exemplary and any desired number of OARO modules can be included in a given stage.

In FIG. 4, the original feed stream solution to be processed is shown directed into the system via line 602 with a feed pump 604 included for applying pressure to the feed stream. The feed pump 604 pressurizes feed stream 602 to drive solvent across the membranes of each OARO module in stage 506, from the high pressure sides to the low pressure sides. The first stage 506 receives the feed stream 602 via the inlet 614 on the high pressure side 606a of the first OARO module 606. Solvent is driven across the osmotic membrane 616, from the high pressure side 606a to the low pressure side 606b of the first osmotically assisted reverse osmosis module 606. An outlet 618 on the high pressure side 606a of the first OARO module 606 outputs a first concentrate solution 620. The concentrate solution 620, still being pressurized from the feed pump 604, enters the second OARO module 608 of stage 506 via the inlet 622 on the high pressure side 608a and solvent is driven across the membrane 624. An outlet 626 on the high pressure side 608a of the second OARO module 608 outputs a second concentrate solution 628, which generally has a higher concentration of solute compared with the first concentrate solution 620. Next, the second concentrate solution 628 enters the third OARO module 610 of stage 506 via the inlet 630 on the high pressure side 610a. Solvent is driven across the membrane 632 due to the pressure provided by feed pump 604, and a third concentrate solution 636 is output at the outlet 634. The third concentrate solution 636 generally has a solute concentration which is higher than that of the first and second concentrate solutions 620, 628. The third concentrate solution then enters the fourth OARO module 611 of stage 506. Accordingly, the fourth RO module 611 outputs a yield stream 638 which is split into two streams, a recycle stream 638a and a concentrate stream 638b. Concentrate stream 638b is removed from the system as a concentrate product or as waste. The area of the membranes 616, 624, 632, and 615 can be sized to achieve a desired solute concentration before concentrate stream 638b is removed as a concentrate product.

The recycle stream 638a is introduced into the low pressure side 611b of the fourth OARO module 611, where it is mixed with the permeate which has crossed membrane 615. This mixture of permeate and concentrate exits the low pressure side 611b of the fourth OARO module 611, and is referred to as a diluted stream 640. The diluted stream 640 enters the third OARO module 610 via the inlet 641 on the low pressure side 610b, where it is mixed with the permeate which has crossed membrane 632. This mixture of permeate and concentrate exits outlet 642 of the low pressure side 610b of the third OARO module 610, and is referred to as diluted stream 643. The diluted stream 643 enters the second OARO module 608 via the inlet 644 on the low pressure side 608b, where it is mixed with the permeate which has crossed membrane 624. This mixture of permeate and concentrate exits outlet 645 of the low pressure side 608b of the second OARO module 608, and is referred to as diluted stream 646. The diluted stream 646 enters the first OARO module 606 via the inlet 647 of the low pressure side 606b, where it is mixed with the permeate which has crossed membrane 616. This mixture of permeate and concentrate exits outlet 648 of the low pressure side 606b of the first OARO module 606, and is referred to as diluted stream 649.

By sending the concentrate product of recycle stream 638a back into the low pressure side 611b of the fourth OARO module 611, and through the low pressure sides 610b, 608b, 606b, the osmotic pressure differential across membranes 615, 632, 624, 616 is reduced. As a result, lower pressure is required to achieve pure water flux compared with traditional RO processes. The solute concentration of the diluted stream 649 leaving the low pressure side 606b of the first OARO module 606 in stage 506 is diluted relative to the feed stream 602. The level of dilution dictates the maximum osmotic pressure differential in the OARO modules 606, 608, 610, 611 of stage 506. The maximum osmotic pressure differential can be controlled by the amount of concentrate solution 638 which is split and reintroduced as recycle stream 638a into the low pressure side 611b. Note that the absolute amount of solute remaining in the system is reduced, due to the removal of solute via concentrate stream 638b.

The diluted stream 649 leaving the low pressure side 606b of the first OARO module 606, or more generally leaving the first stage 506, is fed to an intermediate section. Here, the diluted stream 649 is first pressurized by an interstage pump 650 and then fed as part of a feed stream 652 into the second stage 508, which includes intermediate osmotically assisted reverse osmosis modules 612 and 613. In particular, feed stream 652 is received in the high pressure side 612a via inlet 654 of the first intermediate OARO module 612. The interstage pump 650 pressurizes feed stream 649 to drive solvent across all membranes of the OARO units which may be arranged in the second stage S2. The interstage pump 650 first drives solvent across membrane 656, from the high pressure side 612a to the low pressure side 612b of the first intermediate OARO module 612. An outlet 658 on the high pressure side 612a of the first OARO module 612 outputs a concentrate solution as output stream 660. The concentrate solution 660, still being pressurized by the interstage pump 650, enters the high pressure side 613a of second intermediate OARO module 613. Accordingly, the second intermediate RO module 613 outputs a second concentrate solution 661, which is split into two streams, a recycle stream 661a and a concentrate stream 661b. Concentrate stream 661b is removed from the system as a concentrate product or as waste. The recycle stream 661a is introduced into the low pressure side 613b of the second intermediate OARO module 613, where it is mixed with the permeate which has crossed membrane 657. This mixture of permeate and concentrate solution, is referred to generally as a dilute stream 662, is output from the low pressure side 613b of the second intermediate OARO module 613. The diluted stream 662 enters the first intermediate OARO module 612 via the inlet 664 on the low pressure side 612b, where it is mixed with the permeate which has crossed membrane 656. This mixture of permeate and concentrate exits outlet 666 of the low pressure side 612b of the first intermediate OARO module 612, and is referred to as an exit stream 668.

Similar to the fourth OARO module 611 of stage 506, by sending the recycle stream 661a back into the low pressure side 613b, and through the low pressure side 612b, the osmotic pressure differential across membranes 657, 656 in stage 508 is reduced.

The exit stream 668 leaving the low pressure side 612b of the first intermediate OARO module 612 also represents a purified stream exiting the intermediate stage 508 of the system. Generally, the intermediate stage receives the diluted stream 649 from the initial stage 506 and outputs a purified stream 668.

Continuing, the exit stream/purified stream 668 is pressurized by a final pump 670 and is fed into the final reverse osmosis module 510. The final reverse osmosis module 510 operates in substantially the same manner as described above with respect to FIGS. 1A-1C. Accordingly, the pump 670 applies the pressure required to drive solvent across the osmotic membrane 558 of the final reverse osmosis module 510. The purified stream 668 is received on the high pressure side 510a. Ideally, the solute concentration of the purified stream 668 is so low that the final module 510 can be operated at a pressure that is lower than that of the modules 606, 608, 610, 611 in stage 506 or the intermediate modules 612, 613 of stage 508. A concentrate labeled as reject stream 674 exits the high pressure side 510a of the final RO module 510. Reject stream 674 is recycled as a feed to the intermediate stage 508 of intermediate OARO modules 612, 613 as part of feed stream 652. The reject stream 674 desirably has a solute concentration about equal to the solute concentration of diluted stream 649 leaving the first stage 506. For purposes of this disclosure, an "about equal" concentration is obtained when the solute concentration of the diluted stream 649 divided by the solute concentration of the reject stream 674 is from 0.5 to 2. Of course, the liquid streams may contain more than one solute, and this comparison can be performed for any solute.

A final permeate product 672 is removed from the final RO stage 510 on the low pressure side 510b. The permeate product 672 is the final purified solvent (e.g., water) which has passed through the initial stage 506 of modules 606, 608, 610, 611, the intermediate stage 508 of intermediate modules 612, 613, and the final stage 510.

The aforementioned benefits of the exemplary systems and methods disclosed herein can be further obtained by adding additional intermediate OARO stages in the intermediate section. An embodiment of the present disclosure according to this aspect is illustrated in FIG. 5.

Figure 5:
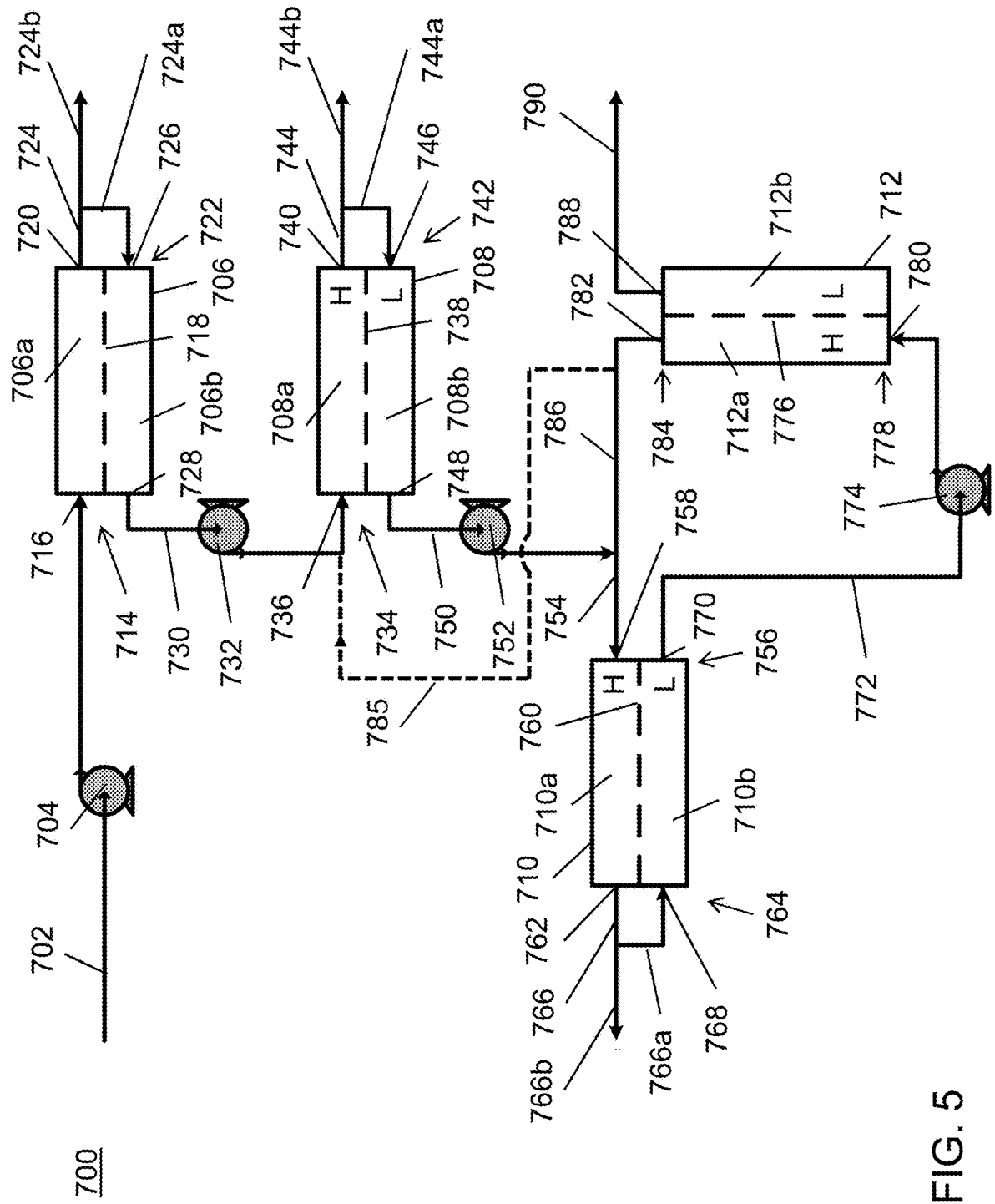
FIG. 5 is a schematic depiction of a cross-current cascading RO arrangement having multiple intermediate cross-current osmotically assisted reverse osmosis stages according to embodiments of the present disclosure.

Referring to FIG. 5, reference numeral 700 indicates, generally, the system and process having a staged, partially cascading cross-current membrane arrangement for purifying the feed stream with multiple modules. The original feed stream solution to be processed is shown directed into the system via line 702 with a feed pump 704 included for applying pressure to the feed stream. The system 700 includes an initial reverse osmosis stage 706 and a final reverse osmosis stage 712. The system also includes an intermediate section that is shown here as including a first intermediate stage 708 and a second intermediate stage 710. Each stage 706, 708, 710, 712 has a semipermeable membrane separating a high pressure side and a low pressure side, and a first end and a second end opposite the first end. While the system 700 of FIG. 5 is illustrated with two intermediate stages (i.e., 708, 710), this number is only exemplary and any desired number of intermediate reverse osmosis stages can be included.

The first or initial OARO stage 706 receives the feed stream 702 on the high pressure side 706a via inlet 716 at a first end 714. The feed pump 704 pressurizes feed stream 702 to drive solvent across the osmotic membrane 718, from the high pressure side 706a to the low pressure side 706b of the initial osmotically assisted reverse osmosis stage 706. An outlet 720 on the high pressure side 706a of the osmotically assisted initial reverse osmosis stage 706 located at the second end 722 outputs a yield stream 724. The pressure of yield stream 724 is reduced, preferably through one of a pressure recovery device, generator, or valve (not shown), and split into a recycle stream 724a and a concentrate stream 724b. Concentrate stream 724b is removed from the system as a concentrate product or as waste. The recycle stream 724a is reintroduced into the low pressure side 706b of the initial osmotically assisted reverse osmosis stage 706 via inlet 726 at the second end 722, and is mixed with the permeate which has crossed membrane 718. Again, using the recycle stream 724a as the liquid in the low-pressure side reduces the osmotic pressure differential. This diluted stream 730 is output from the low pressure side 706b of the initial osmotically assisted reverse osmosis stage 706 via outlet 728 located at the first end 714.

The diluted stream 730 leaving the low pressure side 706b of the initial osmotically assisted reverse osmosis stage 706 is pressurized by an interstage pump 732 and fed into the first intermediate OARO stage 708. In particular, diluted solution 730 is received by the high pressure side 708a via inlet 736 at first end 734. The interstage pump 732 pressurizes diluted stream 730 to drive solvent across the osmotic membrane 738, from the high pressure side 708a to the low pressure side 708b of the second osmotically assisted reverse osmosis stage 708. An outlet 740 on the high pressure side 708a of the first intermediate osmotically assisted reverse osmosis stage 708 is located at the second end 742 and outputs a yield stream 744. The pressure of yield stream 744 is reduced, preferably though one of a pressure recovery device, generator, or valve (not shown), and split into recycle stream 744a and concentrate stream 744b. Concentrate stream 744b is removed from the system as a concentrate product or as waste. The recycle stream 744a is reintroduced into the low pressure side 708b of the first intermediate osmotically assisted reverse osmosis stage 708 via inlet 746 at the second end 742, where it is mixed with the permeate which has crossed membrane 738. This exit stream 750 is output from the low pressure side 708b of the first intermediate osmotically assisted reverse osmosis stage 708 via outlet 748 at the first end 734.

The exit stream 750 leaving the low pressure side 708b of the first intermediate reverse osmosis stage 708 is pressurized by an interstage pump 752 and fed as part of a feed stream 754 into the second intermediate osmotically assisted reverse osmosis stage 710. In particular, feed stream 754 is received on the high pressure side 710a via inlet 758 located at a first end 756. The interstage pump 752 pressurizes feed stream 754 to drive solvent across the osmotic membrane 760, from the high pressure side 710a to the low pressure side 710b of the second intermediate osmotically assisted reverse osmosis stage 710. An outlet 762 on the high pressure side 710a of the second intermediate osmotically assisted reverse osmosis stage 710 outputs a yield stream 766 from the second end 764. The pressure of yield stream 766 is reduced, preferably though one of a pressure recovery device, generator, or valve (not shown), and split into recycle stream 766a and concentrate stream 766b. Concentrate stream 766b is removed from the system as a concentrate product or as waste. The recycle stream 766a is reintroduced into the low pressure side 710b of the second intermediate osmotically assisted reverse osmosis stage 710 via inlet 768 at the second end 764, where it is mixed with the permeate which has crossed membrane 760. This mixture of permeate and concentrate is output from the low pressure side 710b via outlet 770 located at the first end 756 of the second intermediate osmotically assisted reverse osmosis stage 710. This exit stream 772 can also be referred to as the purified stream leaving the intermediate section.

The exit stream/purified stream 772 leaving the low pressure side 710b of the second intermediate osmotically assisted reverse osmosis stage 710 is pressurized by a final pump 774 and is fed into the final RO stage 712. The pump 774 applies the pressure required to drive solvent across the osmotic membrane 776 of the final RO stage 712. The purified stream 772 is received on the high pressure side 712a of the RO stage 712 via inlet 780 located at a first end 778. An outlet 782 on the high pressure side 712a of the final RO stage 712 is located at the second end 784 and outputs a concentrate shown as reject stream 786, which is illustrated here as being recycled to the second intermediate OARO stage 710 as part of feed stream 754. However, it is also contemplated that the reject stream 786 could be mixed with the diluted stream 730 that is being fed into the first intermediate section (indicated by dotted line 785). The reject stream 786 preferably has a solute concentration about equal to the solute concentration of the liquid stream 750 or 730 that it is being mixed with.

A final diluted or permeate product 790 is removed from the low pressure side 712b of the final RO stage 712 via outlet 788. The permeate product 790 is the final purified solvent (e.g., water) which has passed through each of the osmotically assisted reverse osmosis stages in the system 700. Again, for all stages except the final stage, the output from the high pressure side of a given osmotically assisted reverse osmosis stage is used as the input for the low pressure side of the same osmotically assisted reverse osmosis stage, with a concentrate stream being used to remove solute. For all stages except the initial stage, the output of the low pressure side of a given stage is then used as the input to the high pressure side of the stage downstream.

By adding additional stages as illustrated in FIG. 5, the maximum system pressure can be reduced, or energy consumption can be reduced, or a higher concentration reject can be generated. In particular embodiments, the maximum system pressure is less than 300 psig. The liquid feed stream can have a solute concentration of about 3 wt % to about 12 wt %; and the concentrate stream of the initial reverse osmosis stage can have a higher solute concentration, which can range from about 7 wt % to about 25 wt %. The system may have an energy consumption of less than 4.0 kWh/m$^3$ of permeate generated.

Referring to FIG. 6, reference numeral 800 indicates, generally, a system and process having an osmotically assisted reverse osmosis system generating a concentrate stream which is fed to a pressure retarded osmosis (PRO) system. The concentrate stream can be used to perform work, as explained further herein.

While FIG. 6 illustrates a single osmotically assisted reverse osmosis stage 806, it should be understood from the present disclosure that any number and combination of stages could additionally be present, such as those described above. As illustrated here, an initial OARO stage 806 is similar to the initial stage 506 of FIGS. 1A-1C. The initial stage 806 receives the feed stream 802 on the high pressure side 806a. The feed pump 804 pressurizes feed stream 802 to drive solvent across the semipermeable membrane 816, from the high pressure side 806a to the low pressure side 806b of the initial osmotically assisted reverse osmosis stage 806. The high pressure side 806a outputs a yield stream 822. The yield stream 822 is split into two streams, a recycle stream 822a and a concentrate stream 822b. The recycle stream 822a is introduced into the low pressure side 806b of the initial osmotically assisted reverse osmosis stage 806, where it is mixed with the permeate which has crossed membrane 816. This mixture of permeate and concentrate exits the low pressure side 806b of the initial osmotically assisted reverse osmosis stage 806, and is referred to as a diluted stream or a purified solvent 828. Concentrate stream 822b is removed from the initial stage 806 and is eventually used as an input to the pressure retarded osmosis ("PRO") stage 832. The area of the membrane 816 can be sized to achieve a desired solute concentration on the high pressure side 806a before concentrate stream 822b is advanced to the PRO stage 832 as a concentrate product.

The concentrate 822b must first be pressurized to the operating pressure of the PRO stage 832. Accordingly, the concentrate 822b can be fed to pump 830 which pressurizes the concentrate to the final operating pressure of the PRO stage 832. Optionally, a pressure exchanger 852 can be used to reduce the load on the pump 830. To do so, high pressure diluate 844 exiting the outlet 840 at the second end 842 of the PRO stage 832 is split into two streams 844a and 844b. Diluate stream 844a is fed to the pressure exchanger 852 to pressurize the concentrate stream 822b leaving the initial stage 806. The concentrate 822b exits the pressure exchanger 852 as high pressure concentrate stream 860. The high pressure diluate stream 844a exits the pressure exchanger 852 as low pressure diluate 845. The concentrate 822b and the high pressure diluate stream 844a desirably do not mix.

The high pressure concentrate stream 860 is pressurized by the pump 830 and fed to an inlet 836 located at the first end 834 on the high pressure side 832a of the PRO stage 832. Due to the higher osmotic pressure of the high pressure concentrate stream 860 on the high pressure side 832a, relatively pure water flows across the semi-permeable membrane 838 from the low pressure side 832b, thereby diluting the high pressure concentrate stream 860. A dilute feed solution 850 is fed into the second end 842 via inlet 843 on the low pressure side 832b of the PRO stage 832 to help maintain the pressure differential across the membrane 838. This lower osmotic pressure dilute feed solution 850 becomes concentrated as the permeate flows across the membrane 838, and is removed as a concentrated diluting solution 848 from the PRO stage via outlet 846 located at the first end 834 of the PRO stage 832. The difference in osmotic pressure between the high pressure side 832a and the low pressure side 832b of the PRO stage 832 generally should not fall below the operating pressure of the high pressure side 832a at any point in the module, or reverse flux may occur.

The dilute draw solution 850 can be any suitable solution having a lower osmotic activity. For example, the dilute draw solution 850 can include freshwater, municipal water, well water, treated wastewater, treatment plant effluent, brackish water, or, notably, seawater when the concentration of the draw solution is high enough.

The semi-permeable membrane 838 in the PRO system 832 can consist of one or several membranes that can be of any type permitting preferential flux of solvent compared to solute. For example, the membranes selected for the PRO system 832 can include cellulose triacetate membranes, thin film composite membranes, or membranes modified with aquaporin or other flux enhancing components. The membranes can be arranged in flat sheet, spiral wound, or hollow fiber modules, for example.

Ultimately, the lower osmotic pressure feed solution 850 becomes concentrated, while the high pressure concentrate stream 860 becomes diluted, but maintains the feed pressure. The high pressure concentrate stream 860 exits the PRO stage as a high pressure diluate 844. The high pressure diluate 844 exits an outlet 840 located at the second end 842 on the high pressure side 832a of the PRO stage 832. The high pressure diluate 844 can then optionally split into two streams as described above, such that stream 844a is used to pressurize the concentrate feed 822b. High pressure diluate stream 844b advances through a turbine or energy recovery device ("ERD") 854 to generate electricity 856. Alternatively, the high pressure diluate stream 844b can be used to do work, such as flowing through a pressure exchanger (not shown) to pump water elsewhere in the system 800.

After the high pressure diluate 844 is used to generate work or electricity, the pressure is reduced resulting in a low pressure diluate stream 858. At lower pressure and concentration, the low pressure diluate stream 858 can safely be discharged. For example, in the case of seawater system, the low pressure diluate stream 858 can be safely discharged into a marine environment. The low pressure diluate 845 from the pressure exchanger 834 can be mixed with the low pressure diluate stream 858 and similarly discharged.

While the system 800 of FIG. 6 is illustrated with one PRO, the PRO stage 832 may include any desired number of modules to achieve the most efficient recovery of energy. In any event, having a higher concentration feed to the PRO system is important. This is because the larger the difference in osmotic pressure between the high and low pressure sides of the PRO membrane, the higher the water flux through the membrane. As such, fewer membranes will be required to generate meaningful power outputs. In other words, a higher power density can be realized in the PRO system.

The operating pressures of the feed pump, the interstage pump(s), and the final pump can be controlled as desired. However, in specific embodiments, they have specific relationships. In some, the operating pressures of the feed pump, the interstage pump, and the final pump are within 50 psig of each other. In others, the operating pressures of the interstage pump and the final pump are about equal, "about equal" meaning their operating pressures are within 20 psig of each other. In different embodiments, the operating pressure of the interstage pump is at least 50 psig less than the operating pressures of the feed pump and the final pump.

Solutes that can be removed from the liquid feed stream include salt, fluoride, boron, ammonia, or nitrates. The processes of the present disclosure are especially suitable for such molecules/compounds that typically see poor rejection in membrane processes.

The OARO systems and methods of the present disclosure can operate at high pressures which are known to exacerbate membrane fouling due to compaction of solids or precipitates into the membrane surface. As such, various pre-treatment options can be used which at least in part protect the membranes from fouling. Embodiments of the present disclosure illustrating pre-treatment options are illustrated in FIG. 7 and FIG. 8.

Figure 7:
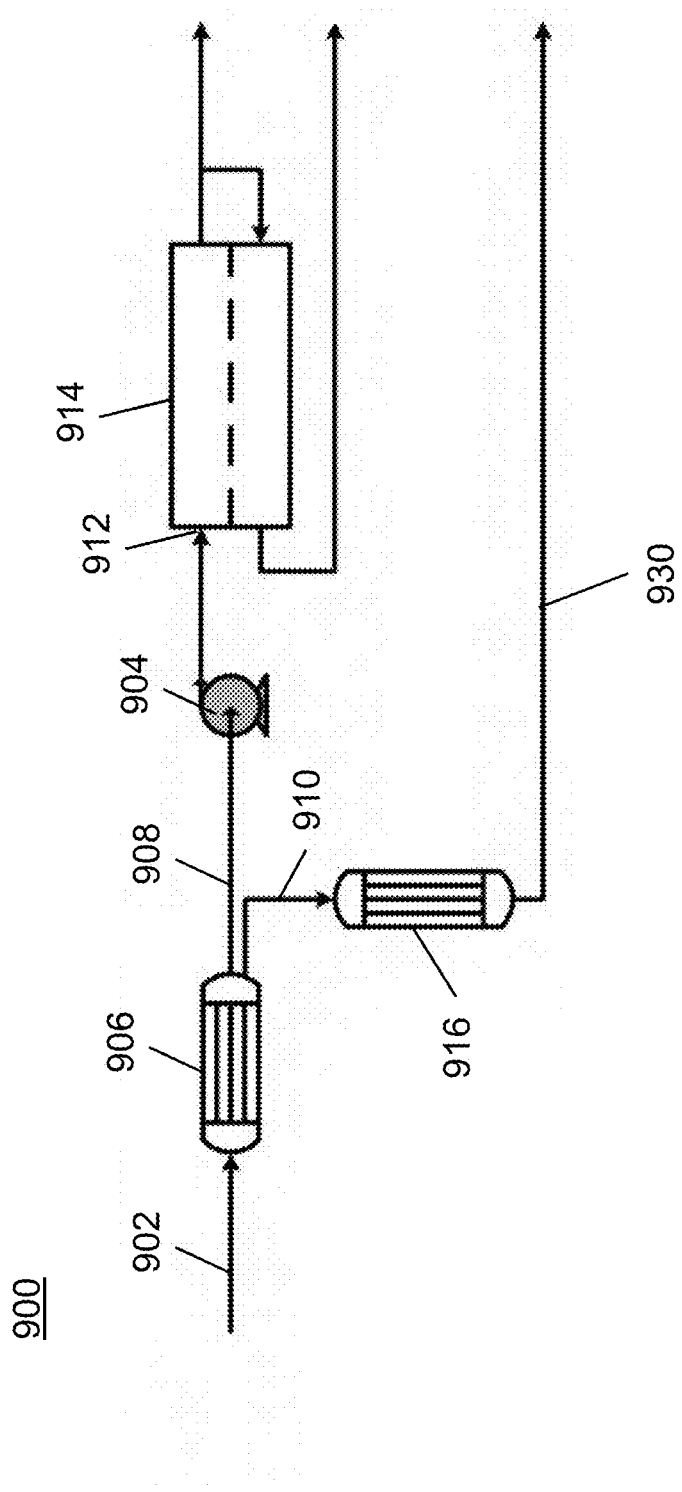
FIG. 7 is a schematic depiction of a cross-current cascading RO arrangement having a capacitive deionization and sonication pretreatment option according to embodiments of the present disclosure.
Figure 8:
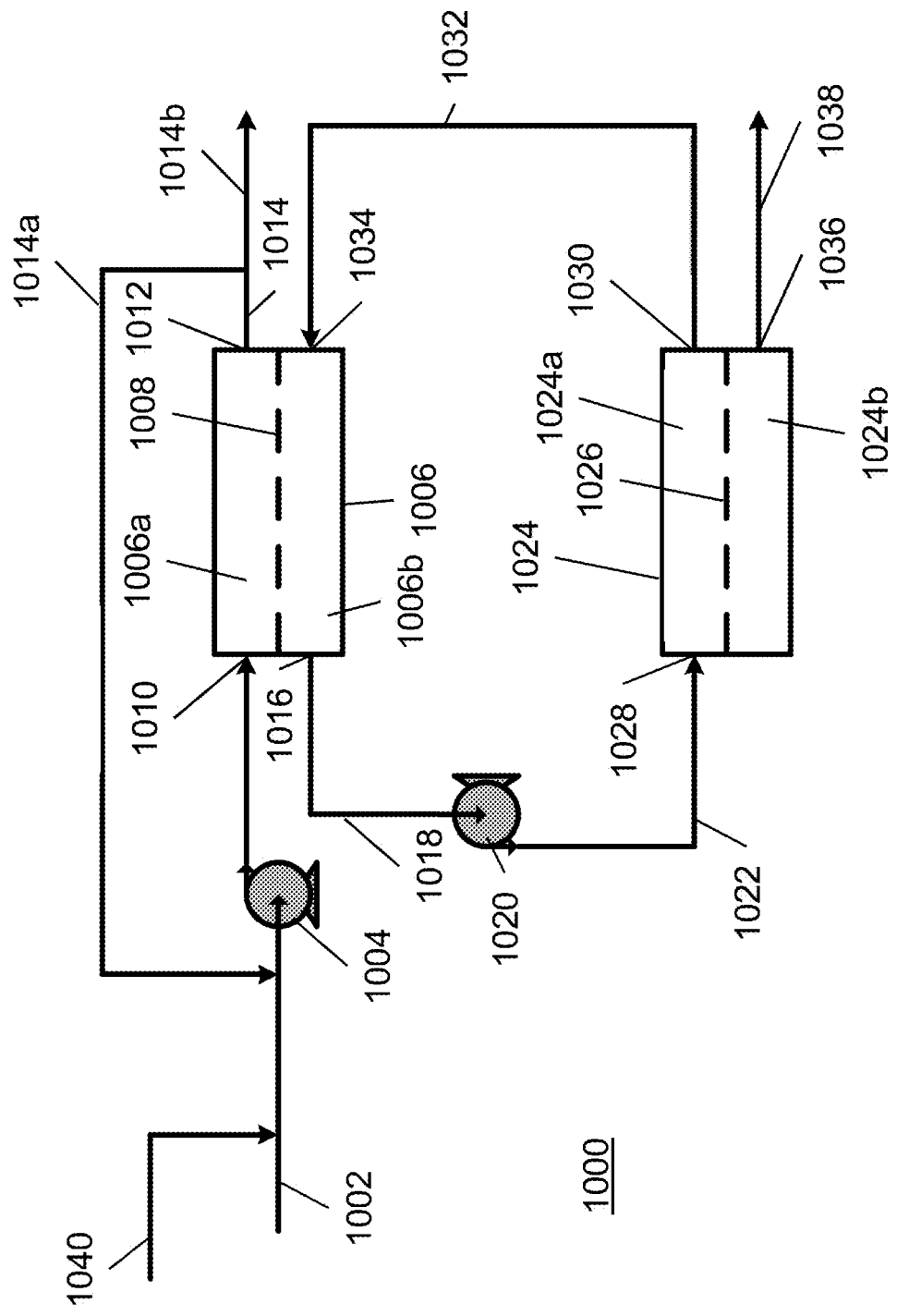
FIG. 8 is a schematic depiction of a cross-current cascading RO arrangement having a forward osmosis pretreatment option according to embodiments of the present disclosure.

Referring to FIG. 7, reference numeral 900 indicates, generally, one system and process that can pre-treat a feed stream having a propensity for high fouling. The pretreatment system and process 900 generally takes place prior to processing in a cascading osmotically assisted reverse osmosis system, such as those illustrated in FIGS. 1A-1C and FIGS. 4-6 described above. The pretreatment options shown in FIG. 7 include capacitive deionization and/or sonication to reduce the fouling or scaling propensity of the feed stream.

In particular, FIG. 7 illustrates the original feed stream to be processed as being directed into the system via line 902, with a feed pump 904 included for applying pressure to the feed stream. The feed stream can be aqueous or organic, but generally contains compounds of particular concern, including polyvalent ions which typically have a lower solubility limit and acid insoluble compounds like many sulfate salts. In order to remove or reduce these scaling ions, a capacitive deionization ("CDI") system 906 can be included in line 902. The CDI system 906 pretreats the feed stream by cycling through two phases, an adsorption cycle and a desorption cycle. During adsorption, a potential difference is applied over two porous electrodes to adsorb ions. In particular, anions and cations are adsorbed by separate electrodes according to the charge of the electrode. Since the anions and cations are separated during adsorption, there is no salt precipitation. As a result, the feed stream solution is deionized into a softened feed stream 908. The softened feed stream 908 is received at a first end inlet 912 of an osmotically assisted reverse osmosis stage or system 914 for further processing. During desorption, after the electrodes are saturated with ions, the potential difference between the electrodes is reversed or reduced to zero, thereby releasing the adsorbed ions, regenerating the electrodes, and forming CDI concentrate stream 910. The CDI concentrate stream 910 is directed away from the osmotically assisted reverse osmosis stage 914 such that the softened feed stream 908 entering the osmotically assisted reverse osmosis stage is consistently deficient in scaling ions. The CDI concentrate stream 910 can be removed from the system as a concentrate product or as waste 930. Alternatively or additionally, the CDI concentrate stream 910 can be further treated in a sonicating system 916 before being removed as product or waste 930. Sonication may be desirable due to the high fouling propensity of the CDI concentrate steam 910. The sonication system 916 generally operates to apply ultrasonic frequencies to break up solids in the CDI concentrate 910 into smaller particles that are unlikely to agglomerate and cause fouling. The softened feed stream 908 can then be used in the osmotically assisted reverse osmosis processes previously described above.

The CDI system 906 can advantageously be selective for polyvalent metals in the feed stream. Selectivity can be achieved through design of the electrode material. Such selectivity is important as it reduces pretreatment costs by forgoing the need to remove monovalent ions which are typically less likely to scale. Another advantage of including CDI system 906 is that it permits high water recoveries and concentration of contaminants (e.g., polyvalent metals). The combination of the CDI system 906 with the osmotically assisted reverse osmosis system 914 is particularly useful in brine concentration applications, which present a unique challenge for membrane processes due to high concentration factors which commonly cause the precipitation of certain compounds. Added control of fouling with the CDI system 906 allows the osmotically assisted reverse osmosis system 914 to achieve brine concentration at lower energy costs compared with thermally driven brine concentration processes, which typically have high energy costs.

Referring now to FIG. 8, another embodiment including pretreatment options according to the present disclosure is illustrated. As discussed previously, the OARO systems and methods of the present disclosure commonly encounter high fouling feed streams in brine concentration applications due to the solubility limit of salts being exceeded as water is removed from the feed streams. This precipitation can cause stoppages of RO processes due to fouling. Acid-insoluble compounds, such as calcium sulfate or barium sulfate which cannot be cleaned off with an acid wash, may be of particular concern. To address these fouling concerns, some embodiments of the present disclosure combine the osmotically assisted reverse osmosis processes discussed above and illustrated in FIGS. 1A-1C and FIGS. 4-6 with forward osmosis ("FO") systems.

FO is a low pressure, osmotically driven process that is less prone to scaling than pressurized processes. The FO process is generally used to draw clean water from a stream that has high fouling propensity or high solids content. An exemplary FO system 1000 combined with an osmotically assisted reverse osmosis process according to embodiments of the present disclosure is illustrated in FIG. 8. In such a system, the FO system acts as pretreatment, and scaling should preferentially occur on the FO membrane rather than in the OARO system used to recover the draw solution, extending the life of the OARO membranes. It is noted that while conventional FO systems can only handle transmembrane pressures up to 75 psi, the FO systems and modules of the present disclosure can handle transmembrane pressures of 200 psi to 400 psi, and are typically operated at these ranges.

FIG. 8 illustrates the original feed stream to be processed as being directed into the system via line 1002, with a feed pump 1004 included for applying pressure to the feed stream. The feed stream can contain contaminants such as acid-insoluble compounds like calcium sulfate or barium sulfate, for example. In order to remove these compounds, a forward osmosis ("FO") system or module 1006 can be included in line 1002. The FO module 1006 includes a semipermeable membrane 1008 separating two low pressure sides 1006a and 1006b. The feed pump 1004 delivers the feed stream 1002 to the low pressure side 1006a via first end inlet 1010. A second end outlet 1012 on the low pressure side 1006a of the FO stage 1006 outputs a yield stream 1014. The yield stream 1014 can optionally be split into two streams, a recycle stream 1014a and a concentrate stream 1014b. Concentrate stream 1014b is removed from the system as a concentrate product or as waste. The recycle stream 1014a is introduced into the feed stream line 1002 upstream of feed pump 1004. As water is drawn across the membrane 1008 from low pressure side 1006a, it will dilute the draw solution on the other low pressure side 1006b of the FO module 1006. The draw solution can be an aqueous solution of inorganic salts, organic salts, or dissolved solids that exert a significant osmotic pressure. The solute in the draw solution should exhibit a low vapor pressure, be thermally and chemically stable, non-toxic, and resistant to permeation across the membranes used in both the forward osmosis and osmotically assisted reverse osmosis processes. Sodium chloride is a useful draw solute since it is chemically stable, exhibits high osmotic pressure in aqueous solutions, is non-volatile, and matches the chemical composition of many brines requiring concentration, which limits concerns about back transfer across the FO membrane 1008. However, sodium chloride brines will be limited in the concentration that can be achieved with a sodium chloride draw solution. Thus, other solutes or mixtures of solutes can be used, if desired.

The diluted draw solution exits the low pressure side 1006b via a first end outlet 1016 of the FO module 1006, and is referred to as diluted draw solution stream 1018. Here, the diluted draw solution stream 1018 is first pressurized by an interstage pump 1020 before being fed as a feed stream 1022 into the osmotically assisted reverse osmosis system 1024. The osmotically assisted reverse osmosis system 1024 operates in substantially the same manner as the osmotically assisted reverse osmosis systems and processes discussed above and illustrated in FIGS. 1A-1C and FIGS. 4-6. Generally, stage 1024 further processes the feed stream 1022 of diluted draw solution 1018, which enters the osmotically assisted reverse osmosis system through a first end inlet 1028. A semipermeable membrane 1026 separates a high pressure side 1024a and a low pressure side 1024b. The flow through the high pressure side is illustrated as being co-current with the flow through the low pressure side, but can also be counter-current. The interstage pump 1020 pressurizes the stream of diluted draw solution 1022 to drive solvent across the semipermeable membrane 1026, from the high pressure side 1024a to the low pressure side 1024b of the osmotically assisted reverse osmosis system 1024. A second end outlet 1030 on the high pressure side 1024a of the osmotically assisted reverse osmosis system 1024 outputs a stream 1032 of concentrated draw solution. The concentrated draw solution 1032 is used on the low pressure side 1006b of the FO module 1008, as previously explained. The permeate which crosses membrane 1026 of the osmotically assisted reverse osmosis system 1024 leaves the low pressure side 1024b via a second end outlet 1036, and can be fed to an additional osmosis stage or can be removed from the system as purified water via line 1038.

The FO module 1006 is specifically designed to handle solids by having a wide flow path for the feed or retentate stream 1002. The FO module 1006 is also designed to reduce the number of points or locations where solids can be trapped and accumulate. To further ensure that precipitation does not occur on membrane 1008, the feed stream 1002 can be seeded with precipitants from line 1040. Such seeding ensures that precipitation occurs in the bulk solution as opposed to on the membrane 1008. The FO membrane 1008 can be a flat sheet, hollow fiber, or spiral wound, and be made of membrane materials known to those having skill in the art, such as cellulose tri acetate or thin film composites. If desired, the FO process can further be enhanced by incorporation of antiscalants to prevent precipitation, or by means to reduce the fouling propensity of the solids, such as ultrasound or sonication to reduce the size of the solid particulates.

While FIG. 8 illustrates a single osmotically assisted reverse osmosis stage 1024, it should be understood from the present disclosure that any number and combination of forward osmosis and osmotically assisted reverse osmosis stages or modules could be used.

Figure 9:
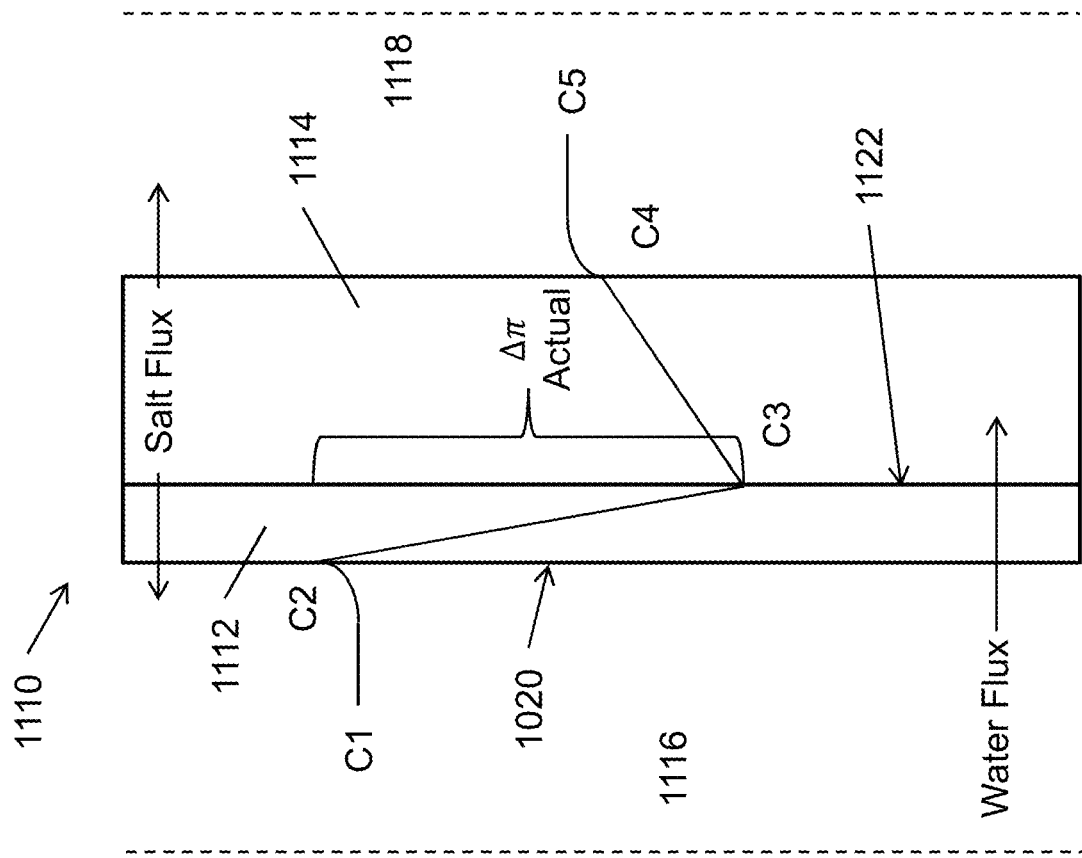
FIG. 9 is a schematic depiction of a concentration polarization effect across a membrane.

The systems and methods of the present disclosure must overcome internal and external concentration polarization across a membrane in order to determine the required driving force. Concentration polarization is schematically described in FIG. 9, where a membrane 1110 having an active layer 1112 and a support layer 1114 is depicted. Point C1 represents the solute concentration in the bulk of the high concentration side 1116 of the membrane 1110, and C5 represents the concentration in the bulk of the low concentration side 1118 of the membrane. The difference in the bulk osmotic pressures between the high concentration side 1116 and the low concentration side 1118 is commonly considered to determine the required driving force. However, in practice, at the surface 1120 of the active layer 1112, concentration is locally higher than the bulk of the high concentration side 1116. This is represented by point C2 on the active layer surface 1120. Conversely, the opposing surface 1122 of the active layer 1120 exhibits a locally lower concentration at point C3 since pure water has crossed the membrane. This concentration gradually increases across the membrane support layer 1114 up to point C4 until it mixes with the bulk solution on the lower concentration side 1118. The net effect is a higher effective osmotic pressure differential. Flux across the membrane is defined with the following equations. Equation 1 is the steady-state mass balance across the active layer:

$$J_w C(x) - D\frac{dC(x)}{dx} = J_s \quad (1)$$

where $J_w$ is the permeate (i.e., water) flux permeating through the membrane, $C_{(x)}$ is the solute concentration in the boundary layer, D is the solute diffusion coefficient in water, x is the distance from the membrane surface, and $J_s$ is the solute flux. The water flux $J_w$ can be defined according to the relationship between osmotic and hydraulic pressures as shown in Equation 2:

$$J_w = A[\Delta P - (\pi_2 - \pi_3)] \quad (2)$$

where A is the hydraulic permeability of the membrane, $\Delta P$ is the difference in hydrostatic pressure, where negative values indicate reverse osmotic flow, and $\pi_2 - \pi_3$ is the difference in osmotic pressures on the two sides of the active layer of the membrane. The solute (salt) flux $J_s$ can be modelled by Fick's Law according to Equation 3:

$$J_s = B[C_2 - C_3] \quad (3)$$

where B is the solute permeability coefficient and $C_2 - C_3$ is the concentration differential across the active layer for the solute.

Accordingly, it becomes critical to ensure good turbulent mixing on the active layer 1112 to reduce external concentration polarization. Also, the support layer 1114 should be as thin as possible while maintaining adequate pressure support, and turbulent mixing should be maintained on the low pressure side 1118 so that internal concentration polarization is limited. The membrane, support layer, and module design are critical for managing concentration polarization and operation of this process. In general, forward osmosis membranes are well suited for the present disclosure due to their thinner support layers compared with traditional reverse osmosis membranes. In particular, hollow fiber membrane modules are well suited for use in the present disclosure. Hollow fiber membrane modules include small fibers that are intrinsically better suited (due to their geometry) to handle external pressure with a much smaller support layer. Such hollow fiber membrane modules are commercially available from TOYOBO.

Other suitable membranes for application in any of the process stages of the present disclosure include RO membranes, nanofiltration membranes, pressure retarded reverse osmosis membranes, forward osmosis membranes, and any other water treatment membrane. This includes membranes that are hydrophobic and/or hydrophilic, and which may have been modified to increase hydrophobicity or hydrophilicity of the active layer, support layer, or other membrane components. Of particular note is that a membrane that exhibits a salt/solute rejection of less than 100% may improve the concentration polarization effects by increasing the concentration within the support layer (C3), lowering the effective osmotic pressure differential.

Aspects of the exemplary embodiments in the present disclosure relate to systems and processes which desalinate water at lower pressures than traditional reverse osmosis systems while also achieving higher water recovery and comparable specific energy usage. As a result, pretreatment costs associated with seawater desalination may be reduced. Additionally, a higher solution concentration can be achieved compared with traditional reverse osmosis, where thermal processes are typically used. Energy efficiency of the exemplary embodiments is improved over thermal processes. Further, the exemplary embodiments advantageously operate at lower temperatures, which is important when heat sensitive products are being produced. Compared to FIGS. 11-14, the present systems (FIGS. 1A-1C and FIGS. 4-6) include a concentrate stream after each osmotically assisted reverse osmosis stage, which removes solute and improves the osmotic pressure differential in subsequent stages.

Several example scenarios were modeled to realize the benefits in energy usage, recovery, and reduction in maximum system pressures realized by the exemplary embodiments of the present disclosure, the results of which are contained in the following examples.

EXAMPLES

The following exemplary systems and processes for reverse osmosis ("RO") were staged according to the membrane arrangements illustrated in FIGS. 11-14 and FIGS. 4-5. Sodium chloride in water was used as the feed solution. Overall pump efficiencies were held at 60%, and any energy recovery devices were assumed to be 90% efficient. For energy calculations, it was assumed that to overcome permeability of the membranes, an additional 50 psi of pressure would have to be added above the osmotic pressure differential across a membrane.

A simple, traditional reverse osmosis case was used as a baseline for energy usage, with and without energy recovery, along with other prior art systems. Several cross-current cascading RO arrangements of the present disclosure were then calculated. All of the exemplary cascading, cross-current RO membrane arrangements staged according to the embodiments disclosed herein compared favorably with existing thermal processes, which generally require about 24-40 kWh per cubic meter of pure water to produce distilled water.

The cross-current membrane stages according to the embodiments disclosed herein were also found to increase the effective rejection of compounds that are typically poorly rejected by membranes. Poor rejection compounds include, for example, boron, ammonia, and nitrates, among others. As a result of the cascading arrangement of the cross-current membrane stages disclosed herein, the rejection of these compounds can be increased to meet stringent discharge standards.

Example 1

Reference

A traditional reverse osmosis ("RO") process with a single stage and no energy recovery device was modeled according to the RO module illustrated in FIG. 11, to be used as a baseline for comparison to the exemplary embodiments. The feed stream received by the RO unit had 3.5 wt % sodium chloride in water and was provided at a flow rate of about 24,353 kg/hr. The full volume of the feed stream was pressurized and fed to the RO module, which produces purified water and a concentrate stream. The process parameters and results of Example 1 are presented below in Table 1.

TABLE 1

Traditional Reverse Osmosis Reference Case.

| | |
|---|---|
| Number of Stages | 1 |
| Mass Recovery | 38.6% |
| Concentration of Reject, wt % | 5.7% |
| Specific Energy Usage, kWh/m$^3$ permeate | 6.078 |
| Maximum Osmotic Pressure Differential, psi | 696.2 |
| Number of Pumps | 1 |
| Number of Energy Recovery Units | 0 |

The required pressure entering the reverse osmosis module has to be sufficient to overcome the osmotic pressure of the concentrate reject stream, which had a concentration of 5.7 wt % and a flowrate of about 14,953 kg/hr in this case. The required pressure also has to overcome the permeability of the membrane (an additional 50 psi in this case). As a result, maximum system pressure at the pump was about 746 psi. The final permeate product (i.e., pure water) was output at a flowrate of about 9,400 kg/hr. The energy required to produce one cubic meter of purified water was about 6.078 kWh.

Example 2

Reference

A traditional RO process with a single module and an energy recovery device ("ERD") was modeled according to the RO module illustrated in FIG. 11, for comparison to the exemplary embodiments. The ERD was used to recover pressure from the concentrate stream. The efficiency of the ERD was assumed to be 90%, with the energy taken as a credit rather than being associated with pressurizing a specific stream. The flowrates and concentrations were identical to Example 1. The process parameters and results of Example 2 are presented below in Table 2.

TABLE 2

Traditional Reverse Osmosis Reference Case, with Energy Recovery.

| | |
|---|---|
| Number of Stages | 1 |
| Mass Recovery | 38.60% |
| Concentration of Reject, wt % | 5.70% |
| Specific Energy Usage, kWh/m$^3$ permeate | 4.198 |
| Maximum Osmotic Pressure Differential, psi | 696.2 |
| Number of Pumps | 1 |
| Number of Energy Recovery Units | 1 |

The specific energy usage in Example 2 was about 4.198 kWh to generate one cubic meter of purified water.

Example 3

In Example 3, a cross-current cascade RO arrangement was staged according to the system illustrated in FIG. 1A. The feed stream received by the initial stage had a concentration of about 3.5 wt % sodium chloride in water, which was provided at a flow rate of about 24,353 kg/hr and pressurized with the feed pump to about 188 psi. The concentrate stream from the initial stage had a 7.5 wt % solute concentration and a flow rate of about 5,143 kg/hr. The interstage pump pressurized the diluted stream leaving the low pressure side of the initial to about 332 psi, and the diluted stream had a flowrate of about 19,211 kg/hr. The concentrate stream from the intermediate stage had a 7.7 wt % solute concentration and a flow rate of about 6,111 kg/hr. The final pump pressurized the purified stream leaving the low pressure side of the intermediate osmotically assisted reverse osmosis stage to about 332 psi at a flowrate of about 25,491 kg/hr. The process parameters and results of Example 3 are presented below in Table 3.

TABLE 3

Staged Cross-Current RO.

| | |
|---|---|
| Number of Stages | 3 |
| Mass Recovery | 53.80% |
| Concentration of Reject, wt % | 7.50% |
| Specific Energy Usage, kWh/m$^3$ permeate | 4.48 |
| Maximum Osmotic Pressure Differential, psi | 281.6 |
| Number of Pumps | 3 |
| Number of Energy Recovery Units | 0 |

Since each pump only need to overcome the maximum osmotic pressure difference across the membrane, due to the recycling of the concentrate exiting the high pressure side into low pressure side, the concentrate can have a higher concentration (about 7.5 wt % at about 5,140 kg/hr) compared with Example 1 (about 5.7 wt % at about 14,953 kg/hr), allowing for higher pure water recovery in the process (about 13,099 kg/hr versus about 9,400 kg/hr). Since the volume on the low pressure side of the initial and intermediate osmotically assisted reverse osmosis stages is reduced by the draw off of the concentrate streams, the concentration of the exit streams leaving the low pressure side will be lower than the concentration of the liquid streams entering the high pressure side. The osmotic pressure differential of the initial and intermediate osmotically assisted reverse osmosis stages, and the subsequent required pump pressure, can be controlled by the relative flow rates of the recycle streams and the concentrate streams. At the final RO stage, the feed concentration is reduced significantly due to dilution from the two prior osmotically assisted reverse osmosis stages (i.e., initial and intermediate osmotically assisted reverse osmosis stages). As a result, the final RO stage can operate at lower pressure. The specific energy consumption in Example 3 was calculated to be about 4.48 kWh per cubic meter of pure water produced, which is improved over the single stage RO of Example 1 (6.078 kWh), though not over Example 2 (4.198 kWh). However, maximum system pressure was reduced compared to both Example 1 and Example 2, from about 746 psi to about 332 psi.

Example 4

In Example 4, a cross-current cascade RO arrangement was staged as in Example 3, however the recovery of water was increased by increasing the concentration of the concentrate streams removed from the system. In practice, this is accomplished by increasing the membrane area in the initial and intermediate osmotically assisted reverse osmosis stages. The feed pump pressurized the feed stream to about 308 psi at a flowrate of about 24,353 kg/hr. The concentrate stream from the initial stage had a 12.7 wt % solute concentration and a flow rate of about 3,027 kg/hr. The interstage pump pressurized the diluted stream leaving the low pressure side of the initial osmotically assisted reverse osmosis stage to about 382 psi at a flowrate of about 21,326 kg/hr. The concentrate stream from the intermediate stage had a 12.6 wt % solute concentration and a flow rate of about 3,733 kg/hr. The final pump pressurized the purified stream leaving the low pressure side of the intermediate osmotically assisted reverse osmosis stage to about 382 psi at a flowrate of about 34,216 kg/hr. The process parameters and results of Example 4 are presented below in Table 4.

TABLE 4

| Staged Cross-Current RO with Increased Recovery. | |
|---|---|
| Number of Stages | 3 |
| Mass Recovery | 72.20% |
| Concentration of Reject, wt % | 12.60% |
| Specific Energy Usage, kWh/m$^3$ permeate | 5.3 |
| Maximum Osmotic Pressure Differential, psi | 332 |
| Number of Pumps | 3 |
| Number of Energy Recovery Units | 0 |

The specific energy usage in Example 4 was about 5.3 kWh per cubic meter, but the recovery was much higher than RO examples 1 and 2, at about 72%.

Example 5

In Example 5, a cross-current cascade RO arrangement with energy recovery devices was staged according to the system illustrated in FIG. 1B. The parameters of Example 5 are identical to Example 4, but with credit taken for energy recovery from the concentrate solution streams exiting the high pressure side of the initial and intermediate osmotically assisted reverse osmosis stages. The flowrate of concentrate entering the energy recovery devices at the initial and intermediate osmotically assisted reverse osmosis stages was about 6,728 kg/hr and 6,799 kg/hr, respectively. The process parameters and results of Example 5 are presented below in Table 5.

TABLE 5

| Staged Cross-Current RO with Energy Recovery. | |
|---|---|
| Number of Stages | 3 |
| Mass Recovery | 72.20% |
| Concentration of Reject, wt % | 12.60% |
| Specific Energy Usage, kWh/m$^3$ permeate | 4.9 |
| Maximum Osmotic Pressure Differential, psi | 332 |
| Number of Pumps | 3 |
| Number of Energy Recovery Units | 2 |

The recovered energy is comparatively small over Example 4 (about 0.36 kWh/m$^3$) due to the low volume of concentrate and lower pressures in each stage.

Example 6

In Example 6, a cross-current cascade RO arrangement was staged according to the system illustrated in FIG. 1A for concentration of a brine stream. The brine stream enters the initial stage with a salt concentration of about 10 wt %. This concentration is beyond the concentration typically processed with reverse osmosis processes. Feed streams with these concentrations are typically processed with thermal processes such as evaporators and multi-stage flashes. The brine stream was provided at a flow rate of about 24,353 kg/hr and pressurized with the feed pump to about 554 psi. The concentrate stream from the initial stage had a 19.8 wt % solute concentration and a flow rate of about 5,534 kg/hr. The interstage pump pressurized the diluted stream leaving the low pressure side of the initial osmotically assisted reverse osmosis stage to about 933 psi at a flowrate of about 18,819 kg/hr. The concentrate stream from the intermediate stage had a 20.3 wt % solute concentration and a flow rate of about 6,602 kg/hr. The final pump pressurized the purified stream leaving the low pressure side of the intermediate osmotically assisted reverse osmosis stage to about 933 psi at a flowrate of about 24,351 kg/hr. The process parameters and results of Example 6 are presented below in Table 6.

TABLE 6

| Staged Cross-Current RO with 10 wt % Brine Feed Stream. | |
|---|---|
| Number of Stages | 3 |
| Mass Recovery | 50.20% |
| Concentration of Reject, wt % | 20% |
| Specific Energy Usage, kWh/m$^3$ permeate | 14.074 |
| Maximum Osmotic Pressure Differential, psi | 882.7 |
| Number of Pumps | 3 |
| Number of Energy Recovery Units | 0 |

Final permeate product (i.e., pure water) was recovered at the final RO stage at a flowrate of about 12,217 kg/hr. The overall system pressure in Example 6 was elevated compared to the 3.5 wt % Examples (Examples 1-5), since higher osmotic pressure differentials are required to perform the separation. The specific energy consumption in Example 6 was about 14.074 kWh per cubic meter of pure water produced, and about 20 wt % solute concentrate was produced as concentrate streams. By comparison, typical thermal processes generally have a specific energy consumption in the range of 25-40 kWh per cubic meter of pure water produced.

Example 7

Example 7 was similar to Example 6, with a brine stream entering the initial RO stage at concentration of about 10 wt %. However, the solute concentration leaving the high pressure side of the initial and intermediate osmotically assisted reverse osmosis stages was increased. The brine stream was provided at a flow rate of about 24,353 kg/hr and pressurized with the feed pump to about 868 psi. The concentrate stream from the initial stage had a 24.1 wt % solute concentration and a flow rate of about 5,503 kg/hr. The interstage pump pressurized the dilute solution leaving the low pressure side of the initial osmotically assisted reverse osmosis stage to about 1,090 psi at a flowrate of about 19,300 kg/hr. The concentrate stream from the intermediate stage had a 24.2 wt % solute concentration and a flow rate of about 5,026 kg/hr. The final pump pressurized the purified stream leaving the low pressure side of the intermediate osmotically assisted reverse osmosis stage to about 1,090 psi at a flowrate of about 27,778 kg/hr. The process parameters and results of Example 7 are presented below in Table 7.

TABLE 7

Staged Cross-Current RO with 10 wt % Brine Feed Stream.

| | |
|---|---|
| Number of Stages | 3 |
| Mass Recovery | 58.60% |
| Concentration of Reject, wt % | 24% |
| Specific Energy Usage, kWh/m$^3$ permeate | 16.65 |
| Maximum Osmotic Pressure Differential, psi | 1,039 |
| Number of Pumps | 3 |
| Number of Energy Recovery Units | 0 |

Final permeate product (i.e., pure water) was recovered at the final RO stage at a flowrate of about 14,274 kg/hr. The 24 wt % solute concentration of the concentrate streams approaches the solubility level of sodium chloride. Such a concentrate product would be suitable, for example, for feed to a crystallizer. Accordingly, Example 7 demonstrates that the cross-current cascade RO processes of the exemplary embodiments disclosed herein are able to replace traditional thermal concentrators commonly used for crystallizers. The specific energy consumption in Example 7 was about 16.65 kWh per cubic meter of pure water produced.

Example 8

In Example 8, a cross-current cascade RO arrangement was staged according to the system illustrated in FIG. 5 in order to show the reduction in total system pressure obtained through the use of additional osmotically assisted reverse osmosis stages according to the exemplary embodiments disclosed herein. Example 8 was again set up to receive a brine stream entering the initial stage at concentration of about 10 wt %. The brine stream was provided at a flow rate of about 24,353 kg/hr and pressurized with the feed pump to about 586 psi. The concentrate stream from the initial stage had a 24.1 wt % solute concentration and a flow rate of about 3,638 kg/hr. The first interstage pump pressurized the diluted stream leaving the low pressure side of the initial osmotically assisted reverse osmosis stage to about 886 psi at a flowrate of about 20,715 kg/hr. The concentrate stream from the first intermediate stage had a 24.2 wt % solute concentration and a flow rate of about 3,222 kg/hr. The second interstage pump pressurized the exit stream leaving the low pressure side of the first intermediate stage to about 852 psi at a flowrate of about 17,493 kg/hr. The concentrate stream from the second intermediate stage had a 24.1 wt % solute concentration and a flow rate of about 3,327 kg/hr. The final pump pressurized the purified stream leaving the low pressure side of the second intermediate stage to about 565 psi at a flowrate of about 28,970 kg/hr. The process parameters and results of Example 8 are presented below in Table 8.

TABLE 8

Four Stage Cross-Current RO with 10 wt % Brine Feed Stream.

| | |
|---|---|
| Number of Stages | 4 |
| Mass Recovery | 58.10% |
| Concentration of Reject, wt % | 24% |
| Specific Energy Usage, kWh/m$^3$ permeate | 14.8 |
| Maximum Osmotic Pressure Differential, psi | 836 |
| Number of Pumps | 4 |
| Number of Energy Recovery Units | 0 |

Final permeate product (i.e., pure water) was recovered at the final RO stage at a flowrate of about 14,166 kg/hr. The addition of another osmotically assisted reverse osmosis stage reduced the maximum system pressure over Example 8 since each stage is required to make less of an osmotic separation. Specific energy consumption in Example 8 was about 14.8 kWh per cubic meter of pure water produced.

Example 9

In Example 9, an existing cascading RO membrane arrangement was staged according to the system described above and illustrated in FIG. 12 for comparison to the exemplary embodiments. The feed stream here had a concentration of about 3.5 wt % sodium chloride in water and a flowrate of about 23,182 kg/hr. The concentrate stream had an 18.8 wt % solute concentration and a flow rate of about 4,312 kg/hr. When running Example 9 to convergence, the location of the feed stream, interstage pumps, and bypasses occasionally need to be changed to a different stage to keep mixed streams of similar concentration. In practice, this will be complicated during startup and process upsets, requiring a multiplicity of valves, bypasses, and plumbing, as well as very skilled operators. The process parameters and results of Example 9 are presented below in Table 9.

TABLE 9

Existing Cascading RO Membrane Arrangement.

| | |
|---|---|
| Number of Stages | 7 |
| Mass Recovery | 81.40% |
| Concentration of Reject, wt % | 18.80% |
| Specific Energy Usage, kWh/m$^3$ permeate | 5.62 |
| Maximum Osmotic Pressure Differential, psi | 538 |
| Number of Pumps | 5 |
| Number of Energy Recovery Units | 0 |

The specific energy consumption in Example 9 was about 5.62 kWh per cubic meter of pure water produced, the maximum system pressure was about 538 psi, and recovery was about 81%. These are all significant improvements over the baseline single stage RO case (Example 1). However, energy consumption in Example 9 was not improved over single stage RO with energy recovery (Example 2). Furthermore, maximum system pressure and energy consumption in Example 9 was not improved over the exemplary embodiments where 3.5 wt % feed stream was used (Examples 3-5).

Example 10

In Example 10, another conventional cascade of osmotically assisted reverse osmosis stages was arranged according to the system described above and illustrated in FIG. 13 for comparison to the exemplary embodiments. In Example 10, the highest pressure is maintained at the final RO stage, so that only one pump is required. The feed stream having a solute concentration of about 3.5 wt % and a flowrate of about 23,182 kg/hr was added at the stage where the concentration was nearest to the feed concentration, and added on the low pressure side. The concentrate stream had a 14.8 wt % solute concentration and a flow rate of about 5,469 kg/hr. To forgo the need for interstage pumps, the recirculating volume was kept high at about 47,170 kg/hr so that the flux in any one stage did not cause a large change in the osmotic pressure differential. The process parameters and results of Example 10 are presented below in Table 10.

TABLE 10

Existing Cascading RO Membrane Arrangement.

| | |
|---|---|
| Number of Stages | 7 |
| Mass Recovery | 76.40% |
| Concentration of Reject, wt % | 14.80% |
| Specific Energy Usage, kWh/m$^3$ permeate | 4.098 |
| Maximum Osmotic Pressure Differential, psi | 405.9 |
| Number of Pumps | 1 |
| Number of Energy Recovery Units | 0 |

The specific energy usage in Example 10 was about 4.098 kWh per cubic meter of pure water produced, comparable to the single stage RO case with energy recovery (Example 2), and maximum system pressure was reduced to 455 psi. Recovery is also comparably higher at 76.4%, requiring less feed volume to be pretreated.

Example 11

Example 11 is similar to Example 10; however the maximum system pressure was reduced to 280 psi by recirculating more volume of water. The process parameters and results of Example 11 are presented below in Table 11.

TABLE 11

Existing Cascading RO Membrane Arrangement.

| | |
|---|---|
| Number of Stages | 7 |
| Mass Recovery | 76.37% |
| Concentration of Reject, wt % | 14.80% |
| Specific Energy Usage, kWh/m$^3$ permeate | 4.675 |
| Maximum Osmotic Pressure Differential, psi | 229 |
| Number of Pumps | 1 |
| Number of Energy Recovery Units | 0 |

Recirculating more water in Example 11 led to an energy penalty, thus specific energy consumption increased to 4.675 kWh per cubic meter of pure water produced over Example 10.

Example 12

In Example 12, an existing two stage RO with energy recovery was arranged according to the system described above and illustrated in FIG. 14 for comparison to the exemplary embodiments. Example 12 is representative of an existing seawater desalination plant, and the two RO stages allow for removal of contaminants that may have low rejection by typical membranes, such as boron. The feed stream here had a concentration of about 3.4 wt % rather than 3.5 wt % and a flowrate of about 3,446,414 kg/hr. About 1,576,235 kg/hr of final permeate product was produced. The feed stream was split approximately in half, with one half pressurized by the feed pump, and the other pressurized in an energy recovery device ("ERD") (here, an isobaric pressure exchanger) by the reject of the first RO stage. A booster pump was used to pressurize the ERD split to full pressure before the streams were mixed and fed to the first RO stage. A portion of the first stage permeate was sent through another RO stage to generate the final permeate. The process parameters and results of Example 12 are presented below in Table 12.

TABLE 12

Two Stage RO with Energy Recovery for Seawater Desalination.

| | |
|---|---|
| Number of Stages | 2 |
| Mass Recovery | 45.74% |
| Concentration of Reject, wt % | |
| Specific Energy Usage, kWh/m$^3$ permeate | 3.25 |
| Maximum Osmotic Pressure Differential, psi | 812 |
| Number of Pumps | 3 |
| Number of Energy Recovery Units | 1 |

The maximum system pressure in this Example 12 was 812 psi, specific energy consumption was 3.25 kWh per cubic meter of pure water produced, and recovery was 45.74%.

Example 13

In Example 13, a cross-current cascade RO arrangement was staged according to the system illustrated in FIG. 1A in order to compare with Example 12. The feed stream received by the initial cross-current membrane stage had a concentration of about 3.4 wt % rather than 3.5 wt %, which was provided at a flow rate of about 3,585,560 kg/hr and pressurized with the feed pump to about 184 psi. The concentrate stream from the initial stage had a 7.46 wt % solute concentration and a flow rate of about 757,136 kg/hr. The interstage pump pressurized the dilute solution leaving the low pressure side of the initial osmotically assisted reverse osmosis stage to about 264 psi at a flowrate of about 2,828,424 kg/hr. The concentrate stream from the intermediate stage had a 7.5 wt % solute concentration and a flow rate of about 899,402 kg/hr. The final pump pressurized the dilute solution leaving the low pressure side of the intermediate osmotically assisted reverse osmosis stage to about 325 psi at a flowrate of about 3,752,808 kg/hr. The process parameters and results of Example 13 are presented below in Table 13.

TABLE 13

Staged Cross-Current RO for Seawater Desalination.

| | |
|---|---|
| Number of Stages | 3 |
| Mass Recovery | 53.8% |
| Concentration of Reject, wt % | 7.5% |
| Specific Energy Usage, kWh/m$^3$ permeate | 4.4 |
| Maximum Osmotic Pressure Differential, psi | 275 |
| Number of Pumps | 3 |
| Number of Energy Recovery Units | 0 |

Pure water was recovered at the final RO stage at a flowrate of about 1,929,022 kg/hr. Compared to Example 12, the recovery is higher and the final permeate generated exceeds 10 million gallons per day. The interstage pump in Example 13 was operated to a lower pressure than the feed pump, specifically the value of the osmotic pressure differential plus 50 psi (to overcome the permeability of the membrane) at the intermediate osmotically assisted reverse osmosis stage. A valve was included at the concentrate solution exit from the high pressure side of the final RO stage to reduce pressure to match the interstage pump. As a result, energy demand for the interstage pump was reduced. The specific energy consumption in Example 13 was 4.4 kWh per cubic meter of pure water produced. Maximum system pressure is reduced over Example 12, from 812 psi to 325 psi, and the recovery is greater at 53.8%. This would allow for a plant using the system in Example 13 to be smaller with reduced pretreatment costs compared to Example 12. With energy recovery devices, the specific energy usage can be lowered to 3.8 kWh/m$^3$.

Example 14

In Example 14. a cross-current cascade RO arrangement was staged according to the system illustrated in FIG. 1C for further comparison with Example 12. The feed stream received by the initial cross-current membrane stage had a concentration of about 3.4 wt %, which was provided at a flow rate of about 3,585,560 kg/hr and pressurized with the feed pump to about 230 psi. The concentrate stream from the initial stage had a 7.3 wt % solute concentration and a flow rate of about 1,124,186 kg/hr. The interstage pump pressurized the dilute solution leaving the low pressure side of the initial osmotically assisted reverse osmosis stage to about 256 psi at a flowrate of about 4,398,603 kg/hr. The concentrate stream from the intermediate stage had a 7.3 wt % solute concentration and a flow rate of about 551,285 kg/hr. The final pump pressurized the dilute solution leaving the low pressure side of the intermediate osmotically assisted reverse osmosis stage to about 230 psi at a flowrate of about 3,847,523 kg/hr. Energy recovery devices were included at the concentrate solution streams exiting the high pressure side of the initial and intermediate osmotically assisted reverse osmosis stages. The flowrate of concentrate entering the energy recovery devices at the initial and intermediate osmotically assisted reverse osmosis stages was about 2,043,974 kg/hr and 918,808 kg/hr, respectively. The process parameters and results of Example 14 are presented below in Table 14.

TABLE 14

Staged Cross-Current RO for Seawater Desalination.

| | |
|---|---|
| Number of Stages | 3 |
| Mass Recovery | 53.3% |
| Concentration of Reject, wt % | 7.3% |
| Specific Energy Usage, kWh/m$^3$ permeate | |
| Maximum Osmotic Pressure Differential, psi | 206 |
| Number of Pumps | 3 |
| Number of Energy Recovery Units | 2 |

Pure water was recovered at the final RO stage at a flow rate of about 1,910,293 kg/hr. Compared to Example 12, the recovery is higher at 53.3% compared with 45.74%. Maximum system pressure is reduced over Example 12, from 812 psi to 256 psi. This would allow for a plant using the system in Example 14 to be smaller with reduced pretreatment costs compared to Example 12.

Example 15

There are compounds that generally see poor rejection in solution separation processes using membranes, typically compounds with small radii or which are non-polar. Some example compounds include, inter alia, fluoride, boron, ammonia, and nitrates. Boron in particular is a problem in seawater desalination as seawater contains roughly 5 mg/L boron, and drinking water requirements may be as low as 0.5 mg/L. To evaluate the effect of the exemplary embodiments on the removal of low rejection compounds, modeling was performed where rejection across membranes of surrogate compounds (MR) was held at 50%, 80% and 90%. It was found that due to the combined concentrating and dilutive effects of the exemplary embodiments, the system saw an 'effective' rejection that is much higher than the rejection of any one of its membranes. Accordingly, that the systems and processes disclosed herein can be used to 'improve' the rejection of a membrane system, and treat compounds that are difficult for traditional RO processes.

A cross-current cascade RO arrangement was staged according to the system illustrated in FIG. 1A. The feed stream received by the initial stage had a concentration of about 3.4 wt %, which was provided at a flow rate of about 3,585,560 kg/hr and pressurized with the feed pump to about 327 psi. About 5 mg/L (i.e., 5 ppmw) of a surrogate compound was fed into the feed stream. The concentrate stream from the initial stage had a 10.0 wt % solute concentration and a flow rate of about 713,879 kg/hr. The interstage pump pressurized the diluted stream solution leaving the low pressure side of the initial osmotically assisted reverse osmosis stage to about 391 psi at a flowrate of about 2,871,680 kg/hr. The concentrate stream from the intermediate stage had a 10.7 wt % solute concentration and a flow rate of about 481,844 kg/hr. The final pump pressurized the dilute solution leaving the low pressure side of the intermediate osmotically assisted reverse osmosis stage to about 391 psi at a flowrate of about 4,010,814 kg/hr. Pure water was recovered at the final RO stage at a flowrate of about 2,389,837 kg/hr.

Applying 50%, 80% and 90% rejection to all the membranes (i.e., 50MR, 80MR, and 90MR, respectively), the concentration of the surrogate compound in the concentrate stream of the initial stage was about 9.78 ppmw 50MR, 12.65 ppmw 80MR, and 13.61 ppmw 90MR. The concentration of the surrogate compound in the concentrate stream of the intermediate stage was about 15.27 ppmw 50MR, 16.79 ppmw 80MR, and 16.39 ppmw 90MR. The purified stream leaving the low pressure side of the intermediate osmotically assisted reverse osmosis stage had a concentration of about 0.69 wt % salt, a flow rate of about 2,389,837 kg/hr, and concentrations of about 3.01 ppmw 50MR, 1.71 ppmw 80MR, and 1.34 ppmw 90MR for the surrogate compound. The amount of surrogate compound in the final permeate product (e.g., pure water) was found to be about 1.51 ppmw 50MR, 0.34 ppmw 80MR, and 0.13 ppmw 90MR. In other words, the effective rejection of the system was found to be about 69.8% 50MR, 93.2% 80MR, and 97.4% 90MR, respectively, which was a higher rejection than any one of the membranes.

A traditional reverse osmosis ("RO") process with a single stage and no energy recovery device was also modeled according to the RO module described above and illustrated in FIG. 11 for comparison to the exemplary embodiments. The feed stream received by the RO unit was the same as the cross-current cascade arrangement, but required the 730 psi of pressure from the feed pump. The reject stream leaving the high pressure side of the traditional RO stage had about 5.6 wt % solute concentration and a flowrate of at about 2,200,430 kg/hr. The permeate was recovered at a flowrate of about 1,385,131 kg/hr. Applying 50%, 80% and 90% rejection to the membrane (i.e., 50MR, 80MR, and 90MR, respectively), the solute concentration of the surrogate compound in the reject stream leaving the high pressure side was about 6.57 ppmw 50MR, 7.52 ppmw 80MR, and 7.83 ppmw 90MR. The concentration of the surrogate compound in the final permeate product (e.g., pure water) was found to be about 2.5 ppmw 50MR, 1.0 ppmw 80MR, and 0.5 ppmw 90MR. Accordingly, the rejection of the cross-current cascade RO arrangement was significantly improved over the comparatively poor rejection of the single stage traditional RO process.

Example 16

Several cases were run to study the arrangement staged according to the system illustrated in FIG. 6. In particular, the amount of power that can be recovered and how much the energy consumption of the osmotically assisted RO system can be offset. The pressure retarded osmosis ("PRO") operating pressure in practice is limited by the module characteristics, and whether a PRO system makes sense in simple terms depends upon the power density that can be achieved in the modules. This favors higher driving forces, where higher fluxes can be achieved.

Case 1 was performed to model a low recovery osmotically assisted reverse osmosis ("OARO") process for seawater, where the concentrate is just slightly higher than expected for traditional reverse osmosis. Water having a 0.5% salinity was used for the PRO feed water. It was assumed that if there is a seawater desalination plant, then high quality freshwater is not readily available. This is true for all "freshwater" cases.

Case 2 was performed to model a high recovery OARO process. The PRO feed stream was seawater rather than fresh/brackish water. This is possible due to the high concentration of the OARO reject water.

Case 3 was arranged similar to case 2, however freshwater was used as the PRO feed instead of seawater, increasing the efficiency.

Cases 4 and 5 repeat the arrangements of cases 2 and 3, respectively. However, the PRO stage was operated at a higher pressure (900 psi). This is because the high concentration OARO reject can enable such high pressure operation. The outlet concentration of the high pressure side had to be evaluated to maintain a 900 psi osmotic pressure differential.

The case descriptions and results are provided in Table 15 below:

TABLE 15

Staged Counter-current Osmotically Assisted Reverse Osmosis and Pressure Retarded Reverse Osmosis

| Case | 1 | 2 | 3 | 4 | 5 |
|---|---|---|---|---|---|
| Description | Low Recovery OARO, Freshwater PRO Feed | High Recovery OARO, Seawater PRO Feed | High Recovery OARO, Freshwater PRO Feed | High Recovery OARO, Seawater PRO Feed | High Recovery OARO, Freshwater PRO Feed |
| OARO Feed Flow, kg/hr | 3585558.75 | 3585558.75 | 3585558.75 | 3585558.75 | 3585559 |
| OARO Feed Concentration, wt % | 3.42% | 3.42% | 3.42% | 3.42% | 3.42% |
| OARO Reject Concentration, wt % | 7.28% | 16.80% | 16.80% | 16.80% | 16.80% |
| OARO Reject Flow | 1684729 | 730662 | 730662 | 730662 | 730662 |
| OARO Specific Energy Consumption, kWh/m$^3$ of permeate | 3.93 | 6.8 | 6.8 | 6.8 | 6.8 |
| OARO Overall Recovery, mass basis | 53% | 79.60% | 79.60% | 79.60% | 79.60% |
| PRO Operating Pressure, psi | 400 | 400 | 400 | 900.00 | 900.00 |
| PRO Feed Solution Concentration, wt % | 0.5% | 3.50% | 0.50% | 3.50% | 0.50% |
| PRO Feed Solution Outlet Concentration, wt % | 0.7% | 7.40% | 1.78% | 4.38% | 0.70% |
| PRO Diluate Outlet Concentration, wt % | 4.7% | 7.50% | 4.85% | 10.10% | 7.53% |
| PRO Diluate Outlet Flow, kg/hr | 2584730 | 1630622.25 | 2530662.50 | 1210662.4 | 1630663 |
| Net Power Produced by PRO, MW | 1.152 | 1.15 | 2.30 | 1.38 | 2.587 |
| As Percent of OARO System Requirements | 15.70% | 6.0% | 12.06% | 7.23% | 13.55% |

In all cases, the system was arranged counter-currently and the OARO concentrate was diluted to make for a more environmentally benign discharge. The amount of power generated by the PRO system is meaningful, and where the available energy and pressure match pump requirements in the OARO process, pressure exchangers, which are typically more efficient than turbines, could be used to drive parts of the OARO process. This would improve overall system power requirements even beyond what is calculated in the cases shown above.

Figure 10A:
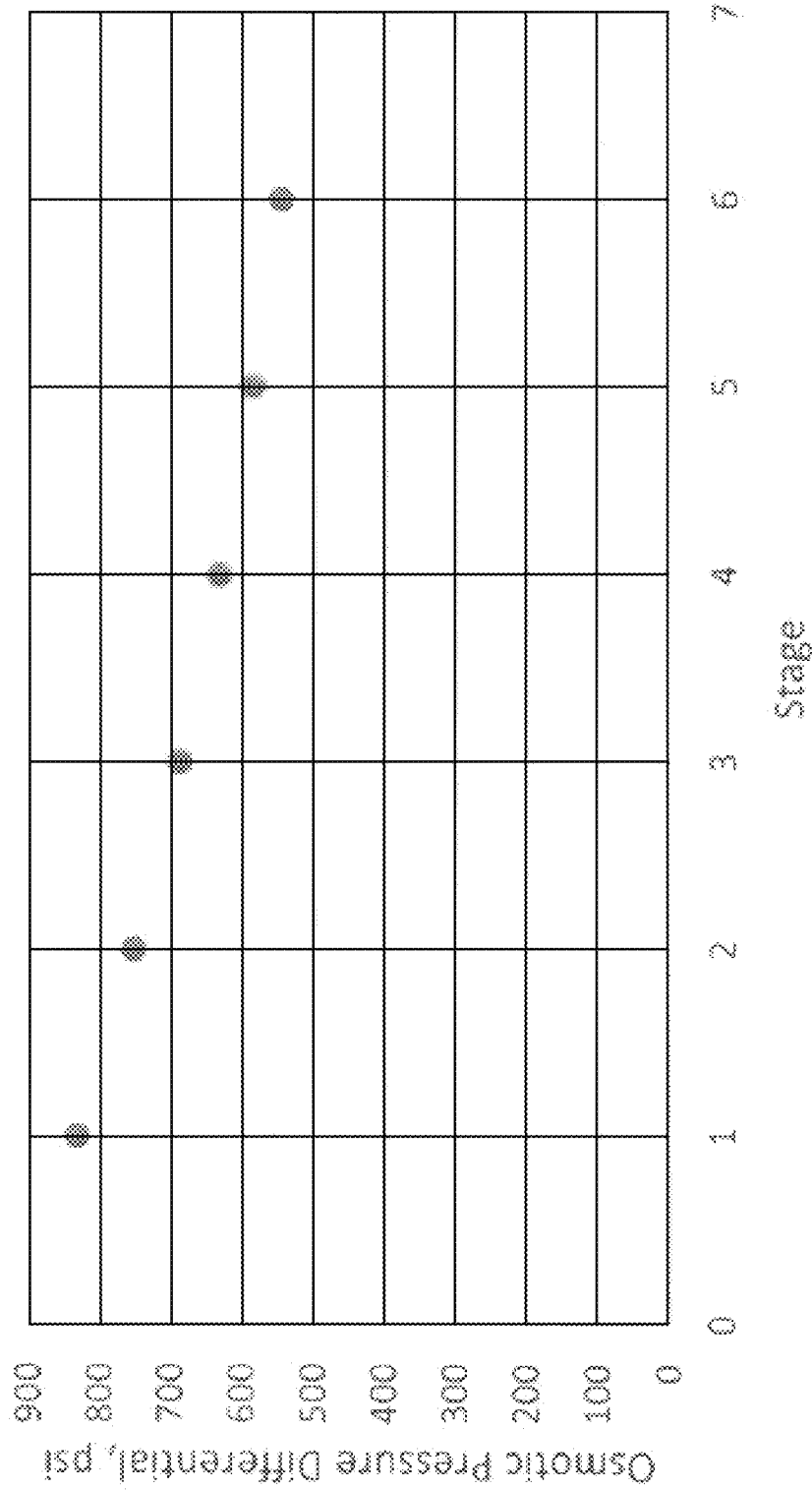
FIG. 10A is a graph of the osmotic pressure differential across six slices of a semi-permeable membrane according to embodiments of the PRO system according to FIG. 6.
Figure 10B:
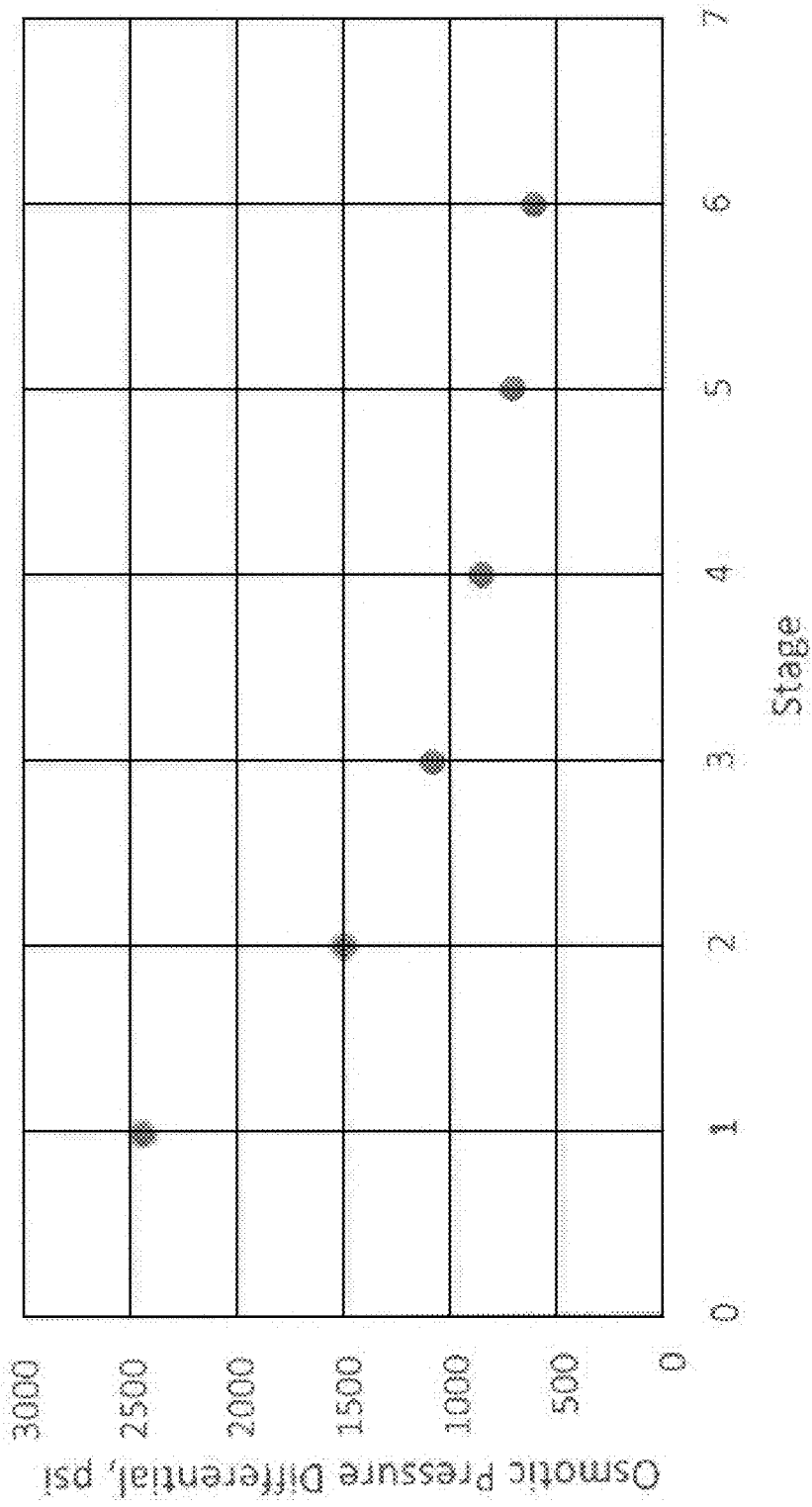
FIG. 10B is a graph of the osmotic pressure differential across six slices of a semi-permeable membrane according to embodiments of the PRO system according to FIG. 6.

FIG. 10A and FIG. 10B are graphs showing the osmotic pressure differential across the membrane of cases 1 and 3, respectively. Six "slices" of equal flux for both case 1 and case 3 were made across the membrane to show the much higher driving force possible with high recovery OARO providing the concentrated draw solution for PRO systems.

The systems and processes of the exemplary embodiments disclosed herein may be used in any case where a solvent and solute need to be separated, and an osmotic separation can be used (i.e., not for bulk filtration of suspended solids). This can include seawater desalination, wastewater treatment, zero liquid discharge facilities, concentration of dissolved species such as in food or drug applications, and especially concentration of dissolved compounds that are heat sensitive.

The present disclosure contemplates at least the following embodiments as described below:

Embodiment 1: A system for purifying a liquid feed stream to obtain a permeate, comprising: (a) an initial reverse osmosis stage having: a high pressure side with a high pressure side inlet for receiving the liquid feed stream and a high pressure side outlet for outputting a recycle stream and a concentrate stream, and a low pressure side with a low pressure side inlet for receiving the recycle stream from the high pressure side outlet, and a low pressure side outlet for outputting a diluted stream; (b) an intermediate section having one or more intermediate reverse osmosis stages arranged in series, wherein each intermediate stage has: a high pressure side with a high pressure side inlet and a high pressure side outlet, a low pressure side with a low pressure side inlet and a low pressure side outlet, a recycle stream and a concentrate stream exiting the high pressure side outlet, the recycle stream being sent to the low pressure side inlet, and an exit stream exiting the low pressure side outlet; and wherein the intermediate section receives the diluted stream from the initial reverse osmosis stage and outputs a purified stream; and (c) a final reverse osmosis stage having: a high pressure side having a high pressure side inlet for receiving the purified stream and a high pressure side outlet for outputting a reject stream, and a low pressure side that outputs the permeate.

Embodiment 2: The system of Embodiment 1, wherein the reject stream of the final reverse osmosis stage is combined with the diluted stream from the initial reverse osmosis stage and received by the intermediate section.

Embodiment 3: The system of Embodiment 2, further comprising a pressurizing means for increasing the pressure of the diluted stream.

Embodiment 4: The system of Embodiment 1, wherein the reject stream of the final reverse osmosis stage is combined with the liquid feed stream and received by the initial reverse osmosis stage.

Embodiment 5: The system of Embodiment 1, further comprising a pressure reduction device through which at least the recycle stream of the initial reverse osmosis stage passes for reducing a pressure of the recycle stream.

Embodiment 6: The system of Embodiment 1, further comprising an energy recovery device at the high pressure side outlet of each intermediate reverse osmosis stage.

Embodiment 7: The system of Embodiment 1, further comprising a feed pump for pressurizing the liquid feed stream received by the initial reverse osmosis stage, an interstage pump for pressurizing the diluted stream that is received by the intermediate section, and a final pump for pressurizing the purified stream received by the final reverse osmosis stage.

Embodiment 8: The system of Embodiment 1, wherein the intermediate section has a first intermediate reverse osmosis stage and a second intermediate reverse osmosis stage, the first intermediate reverse osmosis stage receives the diluted stream from the initial reverse osmosis stage, the high pressure side of the second intermediate reverse osmosis stage receives the exit stream of the first intermediate reverse osmosis stage, the purified stream is the exit stream of the second intermediate reverse osmosis stage; and the reject stream of the final reverse osmosis stage is combined with the exit stream of the first intermediate reverse osmosis stage and received by the second intermediate reverse osmosis stage.

Embodiment 9: The system of Embodiment 1, further comprising a means for pretreating the liquid feed stream upstream of the initial reverse osmosis stage.

Embodiment 10: The system of Embodiment 9, wherein the means for pretreating the liquid feed stream includes a capacitive deionization system or a forward osmosis system.

Embodiment 11: The system of Embodiment 10, further comprising a sonication system for receiving a concentrate from the capacitive deionization system.

Embodiment 12: The system of Embodiment 1, wherein the initial reverse osmosis stage has a plurality of initial reverse osmosis modules, and the low pressure side outlet of each initial reverse osmosis module outputs a yield stream, the yield streams being combined to form the diluted stream.

Embodiment 13: The system of Embodiment 12, wherein for each initial osmosis reverse module, an output stream exiting the high pressure side outlet is split to form a recycle stream that is fed to the low pressure side outlet.

Embodiment 14: The system of Embodiment 13, wherein the recycle stream passes through a valve or energy recovery device prior to being fed to the low pressure side outlet.

Embodiment 15: The system of Embodiment 1, wherein the intermediate section has a plurality of intermediate reverse osmosis stages, and the low pressure side outlet of each intermediate reverse osmosis stage outputs a yield stream, the yield streams being combined to form the purified stream.

Embodiment 16: The system of Embodiment 15, wherein for each intermediate osmosis reverse stage, an output stream exiting the high pressure side outlet is split to form a recycle stream that is fed to the low pressure side outlet.

Embodiment 17: The system of Embodiment 16, wherein the recycle stream passes through a valve or energy recovery device prior to being fed to the low pressure side outlet.

Embodiment 18: The system of Embodiment 1, wherein the initial reverse osmosis stage has a plurality of initial reverse osmosis modules, and the low pressure side outlet of each initial reverse osmosis module outputs a yield stream, each yield stream being sent to a separate permeate concentration stage that outputs a concentrate stream and a permeate stream.

Embodiment 19: The system of Embodiment 1, wherein the intermediate section has a plurality of intermediate reverse osmosis stages, and the low pressure side outlet of each intermediate reverse osmosis stage outputs a yield stream, each yield stream being sent to a separate permeate concentration stage that outputs a concentrate stream and a permeate stream.

Embodiment 20: The system of Embodiment 1, further comprising a pressure retarded osmosis stage having a high pressure side and a low pressure side, wherein the high pressure side of the pressure retarded osmosis stage receives a high pressure concentrate stream and outputs a high pressure diluate; wherein the low pressure side of the pressure retarded osmosis stage receives a dilute solution and outputs a concentrated solution; and wherein the high pressure concentrate stream is produced by pressurizing at least one of (a) the concentrate stream of the initial section and (b) the concentrate stream of the intermediate section.

Embodiment 21: The system of Embodiment 20, wherein the high pressure diluate feeds a pressure exchanger that produces the high pressure concentrate stream.

Embodiment 22: The system of Embodiment 20, wherein the high pressure diluate feeds an energy recovery device.

Embodiment 23: The system of Embodiment 20, wherein the pressure retarded osmosis stage is operated so that fluid flow through the high pressure side and the low pressure side is counter-current or co-current.

Embodiment 24: A method for purifying a liquid feed stream to obtain a permeate, comprising: feeding the liquid feed stream to a system comprising: (a) an initial reverse osmosis stage having: a high pressure side with a high pressure side inlet for receiving the liquid feed stream and a high pressure side outlet for outputting a recycle stream and a concentrate stream, and a low pressure side with a low pressure side inlet for receiving the recycle stream from the high pressure side outlet, and a low pressure side outlet for outputting a diluted stream; (b) an intermediate section having one or more intermediate reverse osmosis stages arranged in series, wherein each intermediate stage has: a high pressure side with a high pressure side inlet and a high pressure side outlet, a low pressure side with a low pressure side inlet and a low pressure side outlet, a recycle stream and a concentrate stream exiting the high pressure side outlet, the recycle stream being sent to the low pressure side inlet, and an exit stream exiting the low pressure side outlet; and wherein the intermediate section receives the diluted stream from the initial reverse osmosis stage and outputs a purified stream; and (c) a final reverse osmosis stage having: a high pressure side having a high pressure side inlet for receiving the purified stream and a high pressure side outlet for outputting a reject stream, and a low pressure side that outputs the permeate.

Embodiment 25: The method of Embodiment 24, wherein the reject stream of the final reverse osmosis stage is combined with the diluted stream from the initial reverse osmosis stage and received by the intermediate section.

Embodiment 26: The method of Embodiment 25, further comprising increasing the pressure of the diluted stream prior to combining the diluted stream with the reject stream.

Embodiment 27: The method of Embodiment 25, wherein a solute concentration of the diluted stream is about equal to a solute concentration of the reject stream prior to combining.

Embodiment 28: The method of Embodiment 24, wherein the intermediate section has a first intermediate reverse osmosis stage and a second intermediate reverse osmosis stage, the first intermediate reverse osmosis stage receives the diluted stream from the initial reverse osmosis stage, the high pressure side of the second intermediate reverse osmosis stage receives the exit stream of the first intermediate reverse osmosis stage, the purified stream is the exit stream of the second intermediate reverse osmosis stage; and the reject stream of the final reverse osmosis stage is combined with the exit stream of the first intermediate reverse osmosis stage and received by the second intermediate reverse osmosis stage.

Embodiment 29: The method of Embodiment 24, wherein a maximum system pressure is less than 300 psig.

Embodiment 30: The method of Embodiment 24, wherein the liquid feed stream has a solute concentration of about 3 wt % to about 12 wt %; and the concentrate stream of the initial reverse osmosis stage has a higher solute concentration of about 7 wt % to about 25 wt %.

Embodiment 31: The method of Embodiment 24, wherein the system has an energy consumption of less than 4.0 kWh/m3 of permeate generated when the liquid feed stream is a seawater stream.

Embodiment 32: The method of Embodiment 24, wherein the system has an energy consumption of less than 20 kWh/m3 of permeate generated when the liquid feed stream is a brine stream.

Embodiment 33: The method of Embodiment 24, wherein the system further comprises a feed pump for pressurizing the liquid feed stream received by the initial reverse osmosis stage, an interstage pump for pressurizing the diluted stream that is received by the intermediate section, and a final pump for pressurizing the purified stream received by the final reverse osmosis stage.

Embodiment 34: The method of Embodiment 33, wherein the operating pressures of the feed pump, the interstage pump, and the final pump are within 50 psig of each other.

Embodiment 35: The method of Embodiment 33, wherein the operating pressures of the interstage pump and the final pump are about equal.

Embodiment 36: The method of Embodiment 33, wherein the operating pressure of the interstage pump is at least 50 psig less than the operating pressures of the feed pump and the final pump.

Embodiment 37: The method of Embodiment 24, wherein a solute removed from the liquid feed stream is salt, fluoride, boron, ammonia, or a nitrate.

Embodiment 38: The method of Embodiment 24, further comprising pretreating the liquid feed stream prior to feeding the liquid feed stream to the system.

Embodiment 39: The method of Embodiment 38, wherein pretreating the liquid feed stream includes performing capacitive deionization or forward osmosis on the liquid feed stream.

Embodiment 40: The method of Embodiment 39, further comprising applying ultrasonic frequencies to a pretreatment concentrate stream generated as a result of pretreating the liquid feed stream.

Embodiment 41: The method of Embodiment 24, further comprising a pressure retarded osmosis stage having a high pressure side and a low pressure side, wherein the high pressure side of the pressure retarded osmosis stage receives a high pressure concentrate stream and outputs a high pressure diluate; wherein the low pressure side of the pressure retarded osmosis stage receives a dilute solution and outputs a concentrated solution; and wherein the high pressure concentrate stream is produced by pressurizing at least one of (a) the concentrate stream of the initial reverse osmosis stage and (b) the concentrate stream of the intermediate section.

Embodiment 42: The method of Embodiment 41, wherein the high pressure diluate feeds a pressure exchanger that produces the high pressure concentrate stream.

Embodiment 43: The method of Embodiment 41, wherein the high pressure diluate feeds an energy recovery device.

Embodiment 44: The method of Embodiment 41, wherein the pressure retarded osmosis stage is operated so that fluid flow through the high pressure side and the low pressure side is counter-current or co-current.

Embodiment 45: A purification system comprising at least one reverse osmosis module, wherein the at least one reverse osmosis module includes: a liquid feed stream that is separated into a feed input stream and a feed bypass stream; a high pressure side; and a low pressure side; wherein the high pressure side receives the feed input stream and outputs a concentrate stream, and wherein the low pressure side receives the feed bypass stream and outputs an exit stream.

Embodiment 46: The purification system of Embodiment 45, wherein the at least one reverse osmosis module is operated so that fluid flow through the high pressure side and the low pressure side is counter-current or co-current.

Embodiment 47: The purification system of Embodiment 45, wherein the feed bypass stream passes through an energy recovery device or a pressure recovery device prior to entering the low pressure side.

Embodiment 48: The purification system of Embodiment 45, wherein the liquid feed stream is pretreated before being separated into the feed input stream and the feed bypass stream.

Embodiment 49: The purification system of Embodiment 48, wherein the liquid feed stream is pretreated by a capacitive deionization system or a forward osmosis system.

Embodiment 50: The purification system of Embodiment 49, wherein a concentrate stream produced by the capacitive deionization system is further treated by sonication.

Embodiment 51: The purification system of Embodiment 45, wherein the at least one reverse osmosis module is part of an initial stage or an intermediate section for obtaining a permeate from the liquid feed stream.

Embodiment 52: The purification system of Embodiment 45, further comprising a pressure retarded osmosis stage having a high pressure side and a low pressure side, wherein the high pressure side of the pressure retarded osmosis stage receives a high pressure concentrate stream and outputs a high pressure diluate; wherein the low pressure side of the pressure retarded osmosis stage receives a dilute solution and outputs a concentrated solution; and wherein the high pressure concentrate stream is produced by pressurizing the concentrate stream of the at least one reverse osmosis module.

Embodiment 53: The purification system of Embodiment 52, wherein the high pressure diluate feeds a pressure exchanger that produces the high pressure concentrate stream.

Embodiment 54: The purification system of Embodiment 52, wherein the high pressure diluate feeds an energy recovery device.

Embodiment 55: The purification system of Embodiment 52, wherein the pressure retarded osmosis stage is operated so that fluid flow through the high pressure side and the low pressure side is counter-current, or co-current.

Embodiment 56: A method for purifying a liquid feed stream to obtain an exit stream, comprising: separating the liquid feed stream into a feed input stream and a feed bypass stream; sending the feed input stream to a high pressure side of a reverse osmosis module; and sending the feed bypass stream to a low pressure side of the reverse osmosis module; wherein the low pressure side outputs the exit stream.

Embodiment 57: The method of Embodiment 56, wherein the reverse osmosis module is operated so that fluid flow through the high pressure side and the low pressure side is counter-current or co-current.

Embodiment 58: The method of Embodiment 56, wherein the feed bypass stream passes through an energy recovery device or a pressure recovery device prior to entering the low pressure side.

Embodiment 59: The method of Embodiment 56, wherein the liquid feed stream is pretreated before being separated into the feed input stream and the feed bypass stream.

Embodiment 60: The method of Embodiment 59, wherein the liquid feed stream is pretreated by a capacitive deionization system or a forward osmosis system.

Embodiment 61: The method of Embodiment 60, wherein a concentrate stream produced by the capacitive deionization system is further treated by sonication.

Embodiment 62: The method of Embodiment 56, wherein the reverse osmosis module is in series with another reverse osmosis module.

Embodiment 63: The method of Embodiment 56, further comprising producing a high pressure concentrate stream by pressurizing a concentrate stream exiting the high pressure side of the reverse osmosis module; and sending the high pressure concentrate stream to a pressure retarded osmosis stage having a high pressure side and a low pressure side, wherein the high pressure side of the pressure retarded osmosis stage receives the high pressure concentrate stream and outputs a high pressure diluate; and wherein the low pressure side of the pressure retarded osmosis stage receives a dilute solution and outputs a concentrated solution.

Embodiment 64: The method of Embodiment 63, wherein the high pressure diluate feeds a pressure exchanger that produces the high pressure concentrate stream.

Embodiment 65: The method of Embodiment 63, wherein the high pressure diluate feeds an energy recovery device.

Embodiment 66: The method of Embodiment 63, wherein the pressure retarded osmosis stage is operated so that fluid flow through the high pressure side and the low pressure side is counter-current or co-current.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A purification system comprising at least one reverse osmosis stage, wherein the at least one reverse osmosis stage includes:
   a liquid feed stream that is separated into a first feed input stream and a first feed bypass stream;
   a first reverse osmosis module having a high pressure side and a low pressure side; and
   a second reverse osmosis module having a high pressure side and a low pressure side;
   wherein the first feed input stream is pressurized to a pressure higher than a pressure of the liquid feed stream, and then received by the first reverse osmosis module high pressure side, and the first reverse osmosis module high pressure side outputs a yield stream; and
   wherein the first feed bypass stream, having the same pressure as the liquid feed stream, is received by the first reverse osmosis module low pressure side, and the first reverse osmosis module low pressure side outputs a first exit stream that is purified compared to the liquid feed stream and has a first salinity;
   wherein the yield stream is split into a second feed input stream and a second feed bypass stream;
   wherein the second feed input stream is received by the second reverse osmosis module high pressure side, and the second reverse osmosis module high pressure side outputs a concentrate stream; and
   wherein the second feed bypass stream is received by the second reverse osmosis module low pressure side, and the second reverse osmosis module low pressure side outputs a second exit stream that is purified compared to the liquid feed stream and has a second salinity; and
   wherein the first exit stream from the first reverse osmosis module low pressure side having the first salinity and the second exit stream from the second reverse osmosis module low pressure side having the second salinity are combined to form a diluted stream.

2. The purification system of claim 1, wherein the at least one reverse osmosis stage is operated so that fluid flow through the first reverse osmosis module and the second reverse osmosis module is counter-current or co-current.

3. The purification system of claim 1,
wherein the liquid feed stream is pretreated before being separated into the first feed input stream and the first feed bypass stream; and
wherein the liquid feed stream is pretreated by a capacitive deionization system that is selective for polyvalent ions or a forward osmosis system.

4. The purification system of claim 3, wherein a concentrate stream produced by the capacitive deionization system is further treated by sonication.

5. The purification system of claim 1, wherein the at least one reverse osmosis stage is an initial stage or an intermediate section for obtaining a permeate from the liquid feed stream.

6. The purification system of claim 1, further comprising a pressure retarded osmosis stage having a high pressure side and a low pressure side,
wherein the high pressure side of the pressure retarded osmosis stage receives a high pressure concentrate stream and outputs a high pressure diluate;
wherein the low pressure side of the pressure retarded osmosis stage receives a dilute solution and outputs a concentrated solution; and
wherein the high pressure concentrate stream is produced by pressurizing the concentrate stream of the at least one reverse osmosis stage.

7. A purification system comprising at least one reverse osmosis stage, wherein the at least one reverse osmosis stage includes:
a liquid feed stream that is separated into a first feed input stream and a first feed bypass stream;
a first reverse osmosis module having a high pressure side and a low pressure side; and
a second reverse osmosis module having a high pressure side and a low pressure side;
wherein the first feed input stream is pressurized to a pressure higher than a pressure of the liquid feed stream, and then received by the first reverse osmosis module high pressure side, and the first reverse osmosis module high pressure side outputs a yield stream; and
wherein the first feed bypass stream, having the same pressure as the liquid feed stream, is received by the first reverse osmosis module low pressure side, and the first reverse osmosis module low pressure side outputs a first exit stream that is purified compared to the liquid feed stream;
wherein the yield stream is split into a second feed input stream and a second feed bypass stream;
wherein the second feed input stream is received by the second reverse osmosis module high pressure side, and the second reverse osmosis module high pressure side outputs a concentrate stream; and
wherein the second feed bypass stream is received by the second reverse osmosis module low pressure side, and the second reverse osmosis module low pressure side outputs a second exit stream that is purified compared to the liquid feed stream; and
wherein the first exit stream from the first reverse osmosis module low pressure side and the second exit stream from the second reverse osmosis module low pressure side are directly combined with each other to form a diluted stream;
wherein the system further comprises a pressure retarded osmosis stage having a high pressure side and a low pressure side;
wherein the high pressure side of the pressure retarded osmosis stage receives a high pressure concentrate stream and outputs a high pressure diluate;
wherein the low pressure side of the pressure retarded osmosis stage receives a dilute solution and outputs a concentrated solution;
wherein the high pressure concentrate stream is produced by pressurizing the concentrate stream of the at least one reverse osmosis stage using a pressure exchanger and a pump downstream of the pressure exchanger, so that the high pressure concentrate stream has a higher pressure than the concentrate stream of the at least one reverse osmosis stage; and
wherein:
(i) the high pressure diluate feeds the pressure exchanger that produces the high pressure concentrate stream; and
(ii) the high pressure diluate feeds an energy recovery device.

8. The purification system of claim 7, wherein the pressure retarded osmosis stage is operated so that fluid flow through the high pressure side and the low pressure side is counter-current, or co-current.

9. The purification system of claim 7, wherein the first feed bypass stream passes through an energy recovery device or a pressure recovery device prior to entering the first reverse osmosis module low pressure side.

10. A method for purifying a liquid feed stream to obtain an exit stream that is purified compared to the liquid feed stream, comprising:
separating the liquid feed stream into a first feed input stream and a first feed bypass stream;
pressurizing the first feed input stream to a pressure higher than a pressure of the liquid feed stream, and then sending the first feed input stream to a high pressure side of a first reverse osmosis module of a reverse osmosis stage; and
sending the first feed bypass stream to a low pressure side of the first reverse osmosis module, wherein the feed bypass stream, having the same pressure as the liquid feed stream, received by the low pressure side;
wherein the first reverse osmosis module low pressure side outputs a first exit stream having a first salinity and the first reverse osmosis module high pressure side outputs a yield stream;
splitting the yield stream into a second feed input stream and a second feed bypass stream;
sending the second feed input stream to a high pressure side of a second reverse osmosis module of the reverse osmosis stage and sending the second feed bypass stream to a low pressure side of the second reverse osmosis module;
wherein the second reverse osmosis module high pressure side outputs a concentrate stream and the second reverse osmosis module low pressure side outputs a second exit stream having a second salinity;
wherein the first exit stream from the first reverse osmosis module low pressure side having the first salinity and the second exit stream from the second reverse osmosis module low pressure side having the second salinity are combined to obtain the exit stream that is purified compared to the liquid feed stream.

11. The method of claim 10, wherein the reverse osmosis stage is operated so that fluid flow through the first reverse osmosis module and the second reverse osmosis module is counter-current or co-current.

12. The method of claim 10, wherein the liquid feed stream is pretreated before being separated into the first feed input stream and the first feed bypass stream.

13. The method of claim 12, wherein the liquid feed stream is pretreated by a capacitive deionization system or a forward osmosis system.

14. The method of claim 13, wherein a concentrate stream produced by the capacitive deionization system is further treated by sonication.

15. The method of claim 10, further comprising:
producing a high pressure concentrate stream by pressurizing a concentrate stream exiting the high pressure side of the second reverse osmosis module; and
sending the high pressure concentrate stream to a pressure retarded osmosis stage having a high pressure side and a low pressure side,
wherein the high pressure side of the pressure retarded osmosis stage receives the high pressure concentrate stream and outputs a high pressure diluate; and
wherein the low pressure side of the pressure retarded osmosis stage receives a dilute solution and outputs a concentrated solution.

16. The method of claim 15, wherein the high pressure diluate feeds a pressure exchanger that produces the high pressure concentrate stream; or
wherein the high pressure diluate feeds an energy recovery device.

17. The method of claim 15, wherein the pressure retarded osmosis stage is operated so that fluid flow through the high pressure side and the low pressure side is counter-current or co-current.

* * * * *